(12) United States Patent
Kim

(10) Patent No.: US 11,728,559 B2
(45) Date of Patent: Aug. 15, 2023

(54) POLYMER COMPOSITION FOR USE IN AN ANTENNA SYSTEM

(71) Applicant: Ticona LLC, Florence, KY (US)

(72) Inventor: Young Shin Kim, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 169 days.

(21) Appl. No.: 17/178,318

(22) Filed: Feb. 18, 2021

(65) Prior Publication Data

US 2022/0263226 A1    Aug. 18, 2022

(51) Int. Cl.
| | |
|---|---|
| *C08K 3/00* | (2018.01) |
| *H01Q 1/24* | (2006.01) |
| *H01Q 21/06* | (2006.01) |
| *C08K 7/14* | (2006.01) |
| *C08K 3/04* | (2006.01) |
| *C08K 3/30* | (2006.01) |
| *C08L 67/04* | (2006.01) |
| *C08K 7/06* | (2006.01) |

(52) U.S. Cl.
CPC .............. *H01Q 1/241* (2013.01); *C08K 3/04* (2013.01); *C08K 3/30* (2013.01); *C08K 7/06* (2013.01); *C08K 7/14* (2013.01); *C08L 67/04* (2013.01); *H01Q 21/065* (2013.01); *C08K 2003/3045* (2013.01)

(58) Field of Classification Search
CPC ... C08K 3/04; C08K 3/30; C08K 7/06; C08K 7/14; C08K 67/03; C08K 67/04; C08K 2003/3045; C08K 3/00; H01Q 1/24; H01Q 1/241; H01Q 1/2283; H01Q 1/38; H01Q 21/065; H01Q 1/243; C08L 67/03; C08L 67/04
See application file for complete search history.

(56) References Cited

U.S. PATENT DOCUMENTS

| | | |
|---|---|---|
| 4,162,466 A | 7/1979 | Hunsinger et al. |
| 4,960,654 A | 10/1990 | Yoshinaka et al. |
| 6,303,524 B1 | 10/2001 | Sharangpani et al. |

(Continued)

FOREIGN PATENT DOCUMENTS

| | | |
|---|---|---|
| CN | 104961916 A | 10/2015 |
| CN | 104961922 A | 10/2015 |

(Continued)

OTHER PUBLICATIONS

Amato, Ing. Francesco, Ph.D., "A Primer on 5G," Jan. 11, 2019, 19 pages.

(Continued)

*Primary Examiner* — Thai Pham

(74) *Attorney, Agent, or Firm* — Dority & Manning, P.A.

(57) ABSTRACT

A polymer composition comprising a semiconductive material distributed within a polymer matrix is provided. The semiconductive material includes inorganic particles and an electrically conductive material, the inorganic particles having an average particle size of from about 0.1 to about 100 μm and an electrical conductivity about 500 μS/cm or less. The polymer matrix contains at least one thermoplastic high performance polymer having a deflection under load of about 40° C. or more. The polymer composition exhibits a dielectric constant of about 4 or more and a dissipation factor of about 0.3 or less, as determined at a frequency of 2 GHz.

35 Claims, 10 Drawing Sheets

(56) References Cited

U.S. PATENT DOCUMENTS

| | | | |
|---|---|---|---|
| 6,346,864 B1 | 2/2002 | Kadota | |
| 6,641,928 B2 | 11/2003 | Takeichi et al. | |
| 6,818,821 B2 | 11/2004 | Fujieda et al. | |
| 7,079,405 B2 | 7/2006 | Tobita et al. | |
| 7,180,172 B2 | 2/2007 | Sethumadhaven et al. | |
| 7,223,807 B2 | 5/2007 | Okamoto et al. | |
| 7,239,261 B2 | 7/2007 | Fujieda et al. | |
| 7,247,590 B2 | 7/2007 | Kawabata et al. | |
| 7,455,901 B2 | 11/2008 | Yano et al. | |
| 7,504,150 B2 | 3/2009 | Lee et al. | |
| 7,531,204 B2 | 5/2009 | Lee et al. | |
| 7,547,849 B2 | 6/2009 | Lee et al. | |
| 7,583,226 B2 | 9/2009 | Sakurada | |
| 7,618,553 B2 | 11/2009 | Kim et al. | |
| 7,648,758 B2 | 1/2010 | Morin | |
| 7,713,439 B2 | 5/2010 | Murouchi et al. | |
| 7,737,198 B2 | 6/2010 | Murouchi et al. | |
| 7,985,351 B2 | 7/2011 | Yamauchi et al. | |
| 8,012,352 B1 | 9/2011 | Eugenio et al. | |
| 8,025,814 B2 | 9/2011 | Uehara et al. | |
| 8,066,907 B2 | 11/2011 | Kohinata et al. | |
| 8,192,645 B2 | 6/2012 | Murouchi et al. | |
| 8,222,802 B2 | 7/2012 | Saito et al. | |
| 8,231,807 B2 | 7/2012 | Yonezawa et al. | |
| 8,309,640 B2 | 11/2012 | Li et al. | |
| 8,337,719 B2 | 12/2012 | Hosoda et al. | |
| 8,425,798 B2 | 4/2013 | Saito et al. | |
| 8,475,924 B2 * | 7/2013 | Lee | H05K 3/184 428/411.1 |
| 8,492,464 B2 | 7/2013 | Li et al. | |
| 8,545,718 B2 | 10/2013 | Nakayama et al. | |
| 8,580,145 B2 | 11/2013 | Osato et al. | |
| 8,642,682 B2 | 2/2014 | Nishihata | |
| 8,692,272 B2 | 4/2014 | Matsumi et al. | |
| 8,715,526 B2 | 5/2014 | Kitai et al. | |
| 8,816,019 B2 | 8/2014 | Ganguly et al. | |
| 8,841,367 B2 | 9/2014 | Zheng et al. | |
| 8,883,900 B2 | 11/2014 | Jiang et al. | |
| 8,895,649 B2 | 11/2014 | Li et al. | |
| 8,926,862 B2 | 1/2015 | Kim et al. | |
| 8,927,661 B2 | 1/2015 | Li et al. | |
| 8,946,333 B2 | 2/2015 | Raman et al. | |
| 8,992,805 B2 | 3/2015 | Nishimura et al. | |
| 9,018,286 B2 | 4/2015 | Daga et al. | |
| 9,023,923 B2 | 5/2015 | An et al. | |
| 9,074,070 B2 | 7/2015 | Yung et al. | |
| 9,185,800 B2 | 11/2015 | Meng et al. | |
| 9,234,092 B2 | 1/2016 | Nakayama et al. | |
| 9,258,892 B2 | 2/2016 | Crosley | |
| 9,283,707 B2 | 3/2016 | Saito et al. | |
| 9,355,753 B2 | 5/2016 | Kim | |
| 9,394,483 B2 | 7/2016 | Wu et al. | |
| 9,538,646 B2 | 1/2017 | Onodera et al. | |
| 9,574,065 B2 | 2/2017 | Miyamoto et al. | |
| 9,896,566 B2 | 2/2018 | Yung et al. | |
| 9,944,768 B2 | 4/2018 | Cheng et al. | |
| 9,982,113 B2 | 5/2018 | Kniess et al. | |
| 10,106,682 B2 | 10/2018 | Kim | |
| 10,119,021 B2 | 11/2018 | Li et al. | |
| 10,150,863 B2 | 12/2018 | Wu et al. | |
| 10,174,180 B2 | 1/2019 | Bao et al. | |
| 10,233,301 B2 | 3/2019 | Kato et al. | |
| 10,273,362 B2 | 4/2019 | Zhang et al. | |
| 10,290,389 B2 | 5/2019 | Wu et al. | |
| 10,329,422 B2 | 6/2019 | Li et al. | |
| 10,604,649 B2 | 3/2020 | Yamanaka | |
| 10,697,065 B2 | 6/2020 | Hua et al. | |
| 10,714,810 B2 | 7/2020 | Hong et al. | |
| 10,741,932 B2 | 8/2020 | Thai et al. | |
| 10,767,049 B2 | 9/2020 | Kim | |
| 10,784,030 B2 | 9/2020 | Lee et al. | |
| 10,822,452 B2 | 11/2020 | Tsuchiya et al. | |
| 10,822,453 B2 | 11/2020 | Washino | |
| 10,899,900 B2 | 1/2021 | Jung et al. | |
| 10,968,311 B2 | 4/2021 | Washino | |
| 11,028,250 B2 | 6/2021 | Zhang et al. | |
| 11,075,442 B2 | 7/2021 | Wang et al. | |
| 2004/0165390 A1 | 8/2004 | Sato et al. | |
| 2005/0130447 A1 | 6/2005 | Takaya et al. | |
| 2007/0057236 A1 | 3/2007 | Hosoda et al. | |
| 2010/0012354 A1 | 1/2010 | Hedin et al. | |
| 2010/0051999 A1 | 3/2010 | Iwase et al. | |
| 2010/0053972 A1 | 3/2010 | Nakayama | |
| 2010/0263919 A1 | 10/2010 | Lee et al. | |
| 2010/0327728 A1 | 12/2010 | Saito et al. | |
| 2012/0040128 A1 | 2/2012 | Finn | |
| 2012/0276390 A1 | 11/2012 | Ji et al. | |
| 2014/0060899 A1 | 3/2014 | Park et al. | |
| 2014/0128545 A1 | 5/2014 | Xiong et al. | |
| 2014/0142571 A1 | 5/2014 | Yung et al. | |
| 2014/0159285 A1 | 6/2014 | Choi | |
| 2014/0171567 A1 | 6/2014 | Guo et al. | |
| 2014/0296411 A1 | 10/2014 | Cheng et al. | |
| 2014/0353543 A1 | 12/2014 | Wu et al. | |
| 2015/0337132 A1 | 11/2015 | Van Der Burgt | |
| 2016/0116948 A1 | 4/2016 | Ou et al. | |
| 2016/0301141 A1 | 10/2016 | Del Castillo et al. | |
| 2017/0002193 A1 | 1/2017 | Cheng et al. | |
| 2017/0273179 A1 | 9/2017 | Kim | |
| 2017/0361584 A1 | 12/2017 | Feng et al. | |
| 2017/0362731 A1 | 12/2017 | Wang et al. | |
| 2017/0367182 A1 | 12/2017 | Wu et al. | |
| 2018/0215894 A1 | 8/2018 | Cheng et al. | |
| 2018/0230294 A1 | 8/2018 | Cheng et al. | |
| 2018/0332710 A1 | 11/2018 | Lin et al. | |
| 2018/0346711 A1 | 12/2018 | Van Der Burgt et al. | |
| 2018/0362758 A1 | 12/2018 | Wu et al. | |
| 2019/0027813 A1 | 1/2019 | Wang | |
| 2019/0031879 A1 | 1/2019 | Ding et al. | |
| 2019/0153216 A1 | 5/2019 | Gong et al. | |
| 2019/0161612 A1 * | 5/2019 | Kim | C08L 23/0884 |
| 2019/0237851 A1 | 8/2019 | Gu | |
| 2019/0269012 A1 | 8/2019 | Van Der Burgt | |
| 2019/0288382 A1 * | 9/2019 | Kamgaing | H01Q 21/22 |
| 2019/0322861 A1 | 10/2019 | Wei et al. | |
| 2019/0341696 A1 | 11/2019 | O'Connor et al. | |
| 2019/0352501 A1 | 11/2019 | Wang et al. | |
| 2019/0352503 A1 | 11/2019 | Cheng et al. | |
| 2020/0017769 A1 | 1/2020 | Konno et al. | |
| 2020/0022264 A1 | 1/2020 | Cheng et al. | |
| 2020/0040133 A1 | 2/2020 | Washino | |
| 2020/0076035 A1 | 3/2020 | Huh et al. | |
| 2020/0091608 A1 * | 3/2020 | Alpman | H03L 7/145 |
| 2020/0219861 A1 | 7/2020 | Kamgaing et al. | |
| 2020/0299582 A1 | 9/2020 | Komatsu | |
| 2020/0369884 A1 | 11/2020 | Lee et al. | |
| 2021/0024701 A1 | 1/2021 | Wang et al. | |
| 2021/0054190 A1 | 2/2021 | Kim | |
| 2021/0057811 A1 | 2/2021 | Kim | |
| 2021/0057827 A1 | 2/2021 | Kim et al. | |
| 2021/0070927 A1 | 3/2021 | Zhang et al. | |
| 2021/0070929 A1 | 3/2021 | Kim et al. | |
| 2021/0070983 A1 | 3/2021 | Kim et al. | |
| 2021/0075093 A1 | 3/2021 | Zhang et al. | |
| 2021/0075162 A1 | 3/2021 | Kim et al. | |
| 2021/0091818 A1 | 3/2021 | Zhang et al. | |
| 2021/0092836 A1 | 3/2021 | Zhang et al. | |
| 2021/0130585 A1 | 5/2021 | Wang et al. | |
| 2021/0130604 A1 | 5/2021 | Ramakrishnan et al. | |
| 2021/0143539 A1 | 5/2021 | Yuan et al. | |
| 2021/0261755 A1 | 8/2021 | Kim | |
| 2021/0269588 A1 | 9/2021 | Washino | |
| 2021/0274652 A1 | 9/2021 | Kim | |
| 2022/0200124 A1 * | 6/2022 | Eastep | H01Q 21/28 |

FOREIGN PATENT DOCUMENTS

| | | |
|---|---|---|
| CN | 105542408 A | 5/2016 |
| CN | 106633680 A | 5/2017 |
| CN | 107022171 A | 8/2017 |
| CN | 105623206 B | 12/2017 |
| CN | 108045022 A | 5/2018 |
| CN | 108102314 A | 6/2018 |
| CN | 108178906 A | 6/2018 |

(56) References Cited

FOREIGN PATENT DOCUMENTS

| | | |
|---|---|---|
| CN | 108250692 A | 7/2018 |
| CN | 207772540 U | 8/2018 |
| CN | 108148433 A | 12/2018 |
| CN | 109301507 A | 2/2019 |
| CN | 109467643 A | 3/2019 |
| CN | 109467722 A | 3/2019 |
| CN | 109509975 A | 3/2019 |
| CN | 208675597 U | 3/2019 |
| CN | 106633860 B | 4/2019 |
| CN | 109735060 A | 5/2019 |
| CN | 109742534 A | 5/2019 |
| CN | 109755729 A | 5/2019 |
| CN | 109755733 A | 5/2019 |
| CN | 109790361 A | 5/2019 |
| CN | 208904227 U | 5/2019 |
| CN | 110154464 A | 8/2019 |
| CN | 209266563 U | 8/2019 |
| CN | 209266570 U | 8/2019 |
| CN | 209266571 U | 8/2019 |
| CN | 209516005 U | 10/2019 |
| CN | 209544599 U | 10/2019 |
| CN | 110505753 A | 11/2019 |
| CN | 110746754 A | 2/2020 |
| CN | 110769594 A | 2/2020 |
| CN | 110903612 A | 3/2020 |
| CN | 111087797 A | 5/2020 |
| CN | 111117169 A | 5/2020 |
| CN | 210706390 U | 6/2020 |
| EP | 2 774 952 B1 | 9/2014 |
| EP | 2 981 573 B1 | 6/2018 |
| EP | 3 674 080 A1 | 7/2020 |
| EP | 3 674 368 A1 | 7/2020 |
| EP | 3 730 545 A1 | 10/2020 |
| JP | 2003268089 A | 9/2003 |
| JP | 2003268241 A | 9/2003 |
| JP | 2004277539 A | 10/2004 |
| JP | 2005078806 A | 3/2005 |
| JP | 4945097 B2 | 1/2007 |
| JP | 2007273537 A | 10/2007 |
| JP | 2010254875 A | 11/2010 |
| JP | 2011052037 A | 3/2011 |
| JP | 5280281 B2 | 9/2013 |
| JP | 5332081 B2 | 11/2013 |
| JP | 5866423 B2 | 2/2016 |
| JP | 2016041828 A | 3/2016 |
| JP | 5919613 B2 | 5/2016 |
| JP | 5924527 B2 | 5/2016 |
| JP | 2017119378 A | 7/2017 |
| JP | 2017120826 A | 7/2017 |
| JP | 6181587 B2 | 8/2017 |
| JP | 2018016753 A | 2/2018 |
| JP | 2018016754 A | 2/2018 |
| JP | 6295013 B2 | 3/2018 |
| JP | 6359225 B2 | 7/2018 |
| JP | 2018109090 A | 7/2018 |
| JP | 6405817 B2 | 10/2018 |
| JP | 6405818 B2 | 10/2018 |
| JP | 2019006973 A | 1/2019 |
| JP | 6470295 B2 | 2/2019 |
| JP | 2019065263 A | 4/2019 |
| JP | 2019099618 A | 6/2019 |
| JP | 2019106434 A | 6/2019 |
| JP | 2019116586 A | 7/2019 |
| JP | 2019127556 A | 8/2019 |
| JP | 2019127557 A | 8/2019 |
| JP | 6576754 B2 | 9/2019 |
| JP | 6576808 B2 | 9/2019 |
| JP | 2019189734 A | 10/2019 |
| JP | 2019189735 A | 10/2019 |
| JP | 2019189736 A | 10/2019 |
| JP | 2019189737 A | 10/2019 |
| JP | 6773824 B2 | 10/2020 |
| KR | 102104752 B1 | 4/2020 |
| KR | 102104753 B1 | 4/2020 |
| KR | 20200070501 A | 6/2020 |
| KR | 102167337 B1 | 10/2020 |
| WO | WO 2014/162254 A1 | 10/2014 |
| WO | WO 2014/180550 A1 | 11/2014 |
| WO | WO 2014/203227 A2 | 12/2014 |
| WO | WO 2017/029608 A1 | 2/2017 |
| WO | WO 2018/026601 A1 | 2/2018 |
| WO | WO 2018/056294 A1 | 3/2018 |
| WO | WO 2018/141769 A1 | 8/2018 |
| WO | WO 2019/042906 A1 | 3/2019 |
| WO | WO 2019/213920 A1 | 11/2019 |
| WO | WO 2020/194196 A1 | 10/2020 |
| WO | WO 2020/217225 A1 | 10/2020 |

OTHER PUBLICATIONS

Bjornson, Emil, "Massive MIMO for 5G," Tutorial at 2015 IEEE International Workshop on Signal Processing Advances in Wireless Communications, (SPAWC), Jun. 29, Stockholm, Sweden 58 pages.

Hassan et al., Massive MIMO Wireless Networks: An Overview, *Electronics*, 2017, 6, 63, pp. 1-29.

Jilani et al., "Millimeter-wave Liquid Crystal Polymer Based Antenna Array for Conformal 5G Applications," *IEEE Antennas and Wireless Propagation Letters*, vol. 18, Issue 1, Jan. 2019, pp. 84-88.

Paper—The Fifth Generation of Wireless Network Communications from TE Connectivity, Apr. 2019, 20 pages.

Paper—Material Solutions for 5G Applications from SABIC, 2018, 4 pages.

Takata, et al., "Electrical properties and practical applications of Liquid Crystal Polymer flex," *IEEE Polytronic 2007 Conference*, pp. 67-72.

Technical Article—Plastic Materials—Liquid Crystal Polymers from Steinwall Plastic Injection Molding, May 2016, 3 pages.

Theil et al., "The Effect of Thermal Cycling on a-C:F,H Low Dielectric Constant Films Deposited by ECR Plasma Enhanced Chemical Vapor Deposition," *Proceedings for the International Interconnect Technology Conference*, Jun. 1998, p. 128-131, 3 pages.

International Search Report and Written Opinion for PCT/US2021/018492 dated May 5, 2021, 9 pages.

Related Application Form.

* cited by examiner

POLYMER COMPOSITION FOR USE IN AN ANTENNA SYSTEM

BACKGROUND OF THE INVENTION

Various types of electrical components will be employed in 5G systems, such as antenna elements. Unfortunately, transmitting and receiving at the high frequencies encountered in a 5G application generally results in an increased amount of power consumption and heat generation. As a result, the materials often used in conventional electronic components can negatively impact high frequency performance capabilities. As such, a need exists for improved electronic components for use in 5G antenna systems.

SUMMARY OF THE INVENTION

In accordance with one embodiment of the present invention, a polymer composition is disclosed that comprises a semiconductive material distributed within a polymer matrix. The semiconductive material includes inorganic particles and an electrically conductive material, the inorganic particles having an average particle size of from about 0.1 to about 100 μm and an electrical conductivity about 500 μS/cm or less. The polymer matrix contains at least one thermoplastic high performance polymer having a deflection under load of about 40° C. or more. The polymer composition exhibits a dielectric constant of about 4 or more and a dissipation factor of about 0.3 or less, as determined at a frequency of 2 GHz.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
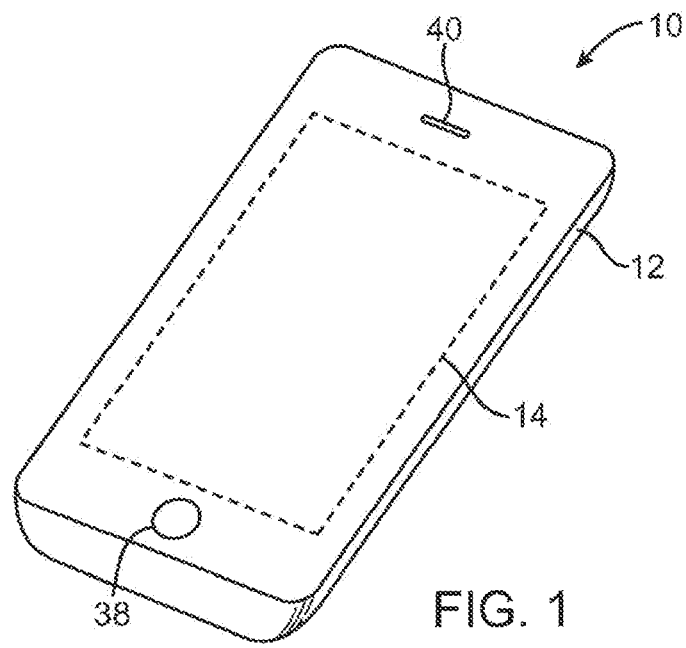
FIGS. 1-2 are respective front and rear perspective views of one embodiment of an electronic component that can employ an antenna system.

It is to be understood by one of ordinary skill in the art that the present discussion is a description of exemplary embodiments only, and is not intended as limiting the broader aspects of the present invention.

Generally speaking, the present invention is directed to a polymer composition that contains a semiconductive material that includes a combination of inorganic particles and an electrically conductive material. The semiconductive material is distributed within a polymer matrix that includes a high performance polymer. By selectively controlling various aspects of the composition, the present inventor has discovered that the resulting composition is able to maintain a unique combination of a high dielectric constant and low dissipation for use in an antenna system. For example, the polymer composition may exhibit a high dielectric constant of about 4 or more, in some embodiments about 8 or more, in some embodiments about 10 or more, in some embodiments from about 10 to about 30, in some embodiments from about 11 to about 25, and in some embodiments, from about 12 to about 24, as determined by the split post resonator method at a frequency of 2 GHz. Such a high dielectric constant can facilitate the ability to form a thin substrate and also allow multiple conductive elements (e.g., antennae) to be employed that operate simultaneously with only a minimal level of electrical interference. The dissipation factor, a measure of the loss rate of energy, may also be relatively low, such as about 0.3 or less, in some embodiments about 0.1 or less, in some embodiments about 0.06 or less, in some embodiments about 0.04 or less, in some embodiments about 0.01 or less, and in some embodiments, from about 0.001 to about 0.006, as determined by the split post resonator method at a frequency of 2 GHz. Notably, the present inventor has also surprisingly discovered that the dielectric constant and dissipation factor can be maintained within the ranges noted above even when exposed to various temperatures, such as a temperature of from about −30° C. to about 100° C. For example, when subjected to a heat cycle test as described herein, the ratio of the dielectric constant after heat cycling to the initial dielectric constant may be about 0.8 or more, in some embodiments about 0.9 or more, and in some embodiments, from about 0.95 to about 1.1. Likewise, the ratio of the dissipation factor after being exposed to the high temperature to the initial dissipation factor may be about 1.3 or less, in some embodiments about 1.2 or less, in some embodiments about 1.1 or less, in some embodiments about 1.0 or less, in some embodiments about 0.95 or less, in some embodiments from about 0.1 to about 0.95, and in some embodiments, from about 0.2 to about 0.9. The change in dissipation factor (i.e., the initial dissipation factor—the dissipation factor after heat cycling) may also range from about −0.1 to about 0.1, in some embodiments from about −0.05 to about 0.01, and in some embodiments, from about −0.001 to 0.

Conventionally, it was believed that polymer compositions that possess the combination of a high dielectric constant and low dissipation factor would not also possess sufficiently good mechanical properties and ease in processing (i.e., low viscosity) to enable their use in certain types of applications. Contrary to conventional thought, however, the polymer composition has been found to possess both excellent mechanical properties and processability. For example, the polymer composition may possess a high impact strength, which is useful when forming thin substrates. The composition may, for instance, possess a Charpy notched impact strength of about 0.5 kJ/m$^2$ or more, in some embodiments from about 1 to about 60 kJ/m$^2$, in some embodiments from about 2 to about 50 kJ/m$^2$, and in some embodiments, from about 5 to about 45 kJ/m$^2$, as determined at a temperature of 23° C. in accordance with ISO Test No. ISO 179-1:2010. The tensile and flexural mechanical properties of the composition may also be good. For example, the polymer composition may exhibit a tensile strength of from about 20 to about 500 MPa, in some embodiments from about 50 to about 400 MPa, and in some embodiments, from about 70 to about 350 MPa; a tensile break strain of about 0.4% or more, in some embodiments from about 0.5% to about 10%, and in some embodiments, from about 0.6% to about 3.5%; and/or a tensile modulus of from about 5,000 MPa o about 20,000 MPa, in some embodiments from about 8,000 MPa to about 20,000 MPa, and in some embodiments, from about 10,000 MPa to about 20,000 MPa. The tensile properties may be determined at a temperature of 23° C. in accordance with ISO Test No. 527:2019. The polymer composition may also exhibit a flexural strength of from about 20 to about 500 MPa, in some embodiments from about 50 to about 400 MPa, and in some embodiments, from about 100 to about 350 MPa; a flexural elongation of about 0.4% or more, in some embodiments from about 0.5% to about 10%, and in some embodiments, from about 0.6% to about 3.5%; and/or a flexural modulus of from about 5,000 MPa o about 20,000 MPa, in some embodiments from about 8,000 MPa to about 20,000 MPa, and in some embodiments, from about 10,000 MPa to about 15,000 MPa. The flexural properties may be determined at a temperature of 23° C. in accordance with 178:2019.

Various embodiments of the present invention will now be described in more detail.

I. Polymer Composition

A. Polymer Matrix

The polymer matrix contains one or more thermoplastic high performance polymers, generally in an amount of from about 15 wt. % to about 85 wt. %, in some embodiments from about 20 wt. % to about 75 wt. %, and in some embodiments, from about 30 wt. % to about 50 wt. % of the entire polymer composition. The high performance polymers have a high degree of heat resistance, such as reflected by a deflection temperature under load ("DTUL") of about 40° C. or more, in some embodiments about 50° C. or more, in some embodiments about 60° C. or more, in some embodiments from about from about 100° C. to about 320° C., in some embodiments from about 150° C. to about 310° C., and in some embodiments, from about 220° C. to about 300° C., as determined in accordance with ISO 75-2:2013 at a load of 1.8 MPa. In addition to exhibiting a high degree of heat resistance, the polymers also typically have a high glass transition temperature, such as about 40° C. or more, in some embodiments about 50° C. or more, in some embodiments about 60° C. or more, in some embodiments about 70° C. or more, in some embodiments about 80° C. or more, and in some embodiments, from about 100° C. to about 320° C. When semi-crystalline or crystalline polymers are employed, the high performance polymers may also have a high melting temperature, such as about 140° C. or more, in some embodiments from about 150° C. to about 420° C., and in some embodiments, in some embodiments from about 200° C. to about 410° C., and in some embodiments, from about 300° C. to about 400° C. The glass transition and melting temperatures may be determined as is well known in the art using differential scanning calorimetry ("DSC"), such as determined by ISO 11357-2:2020 (glass transition) and 11357-3:2018 (melting).

Suitable high performance, thermoplastic polymers for this purpose may include, for instance, polyamides (e.g., aliphatic, semi-aromatic, or aromatic polyamides), polyesters, polyarylene sulfides, liquid crystalline polymers (e.g., wholly aromatic polyesters, polyesteramides, etc.), polycarbonates, polyphenylene ethers, polyphenylene oxides, etc., as well as blends thereof. The exact choice of the polymer system will depend upon a variety of factors, such as the nature of other fillers included within the composition, the manner in which the composition is formed and/or processed, and the specific requirements of the intended application.

Aromatic polymers, for instance, are particularly suitable for use in the polymer matrix. The aromatic polymers can be substantially amorphous, semi-crystalline, or crystalline in nature. One example of a suitable semi-crystalline aromatic polymer, for instance, is an aromatic polyester, which may be a condensation product of at least one diol (e.g., aliphatic and/or cycloaliphatic) with at least one aromatic dicarboxylic acid, such as those having from 4 to 20 carbon atoms, and in some embodiments, from 8 to 14 carbon atoms. Suitable diols may include, for instance, neopentyl glycol, cyclohexanedimethanol, 2,2-dimethyl-1,3-propane diol and aliphatic glycols of the formula HO(CH$_2$)$_n$OH where n is an integer of 2 to 10. Suitable aromatic dicarboxylic acids may include, for instance, isophthalic acid, terephthalic acid, 1,2-di(p-carboxyphenyl)ethane, 4,4'-dicarboxydiphenyl ether, etc., as well as combinations thereof. Fused rings can also be present such as in 1,4- or 1,5- or 2,6-naphthalenedicarboxylic acids. Particular examples of such aromatic polyesters may include, for instance, poly(ethylene terephthalate) (PET), poly(1,4-butylene terephthalate) (PBT), poly (1,3-propylene terephthalate) (PPT), poly(1,4-butylene 2,6-naphthalate) (PBN), poly(ethylene 2,6-naphthalate) (PEN), poly(1,4-cyclohexylene dimethylene terephthalate) (PCT), as well as mixtures of the foregoing.

Derivatives and/or copolymers of aromatic polyesters (e.g., polyethylene terephthalate) may also be employed. For instance, in one embodiment, a modifying acid and/or diol may be used to form a derivative of such polymers. As used herein, the terms "modifying acid" and "modifying diol" are meant to define compounds that can form part of the acid and diol repeat units of a polyester, respectively, and which can modify a polyester to reduce its crystallinity or render the polyester amorphous. Examples of modifying acid components may include, but are not limited to, isophthalic acid, phthalic acid, 1,3-cyclohexanedicarboxylic acid, 1,4-cyclohexane dicarboxylic acid, 2,6-naphthaline dicarboxylic acid, succinic acid, glutaric acid, adipic acid, sebacic acid, suberic acid, 1,12-dodecanedioic acid, etc. In practice, it is often preferable to use a functional acid derivative thereof such as the dimethyl, diethyl, or dipropyl ester of the dicarboxylic acid. The anhydrides or acid halides of these acids also may be employed where practical. Examples of modifying diol components may include, but are not limited to, neopentyl glycol, 1,4-cyclohexanedimethanol, 1,2-propanediol, 1,3-propanediol, 2-methy-1,3-propanediol, 1,4-butanediol, 1,6-hexanediol, 1,2-cyclohexanediol, 1,4-cyclohexanediol, 1,2-cyclohexanedimethanol, 1,3-cyclohexanedimethanol, 2,2,4,4-tetramethyl 1,3-cyclobutane diol, Z,8-bis(hydroxymethyltricyclo-[5.2.1.0]-decane wherein Z represents 3, 4, or 5; 1,4-bis(2-hydroxyethoxy)benzene, 4,4'-bis(2-hydroxyethoxy) diphenylether [bis-hydroxyethyl bisphenol A], 4,4'-Bis(2-hydroxyethoxy)diphenylsulfide [bis-hydroxyethyl bisphenol S] and diols containing one or more oxygen atoms in the chain, e.g. diethylene glycol, triethylene glycol, dipropylene glycol, tripropylene glycol, etc. In general, these diols contain 2 to 18, and in some embodiments, 2 to 8 carbon atoms. Cycloaliphatic diols can be employed in their cis- or trans-configuration or as mixtures of both forms.

The aromatic polyesters, such as described above, typically have a DTUL value of from about 40° C. to about 80° C., in some embodiments from about 45° C. to about 75° C., and in some embodiments, from about 50° C. to about 70° C. as determined in accordance with ISO 75-2:2013 at a load of 1.8 MPa. The aromatic polyesters likewise typically have a glass transition temperature of from about 30° C. to about 120° C., in some embodiments from about 40° C. to about 110° C., and in some embodiments, from about 50° C. to about 100° C., such as determined by ISO 11357-2:2020, as well as a melting temperature of from about 170° C. to about 300° C., in some embodiments from about 190° C. to about 280° C., and in some embodiments, from about 210° C. to about 260° C., such as determined in accordance with ISO 11357-2:2018. The aromatic polyesters may also have an intrinsic viscosity of from about 0.1 dl/g to about 6 dl/g, in some embodiments from about 0.2 to about 5 dl/g, and in some embodiments from about 0.3 to about 1 dl/g, such as determined in accordance with ISO 1628-5:1998.

Polyarylene sulfides are also suitable semi-crystalline aromatic polymers. The polyarylene sulfide may be homopolymers or copolymers. For instance, selective combination of dihaloaromatic compounds can result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer can be formed containing segments having the structure of formula:

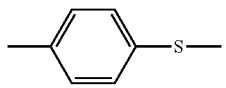

and segments having the structure of formula:

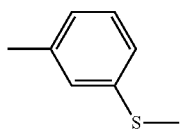

or segments having the structure of formula:

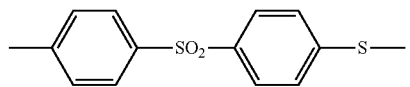

The polyarylene sulfide may be linear, semi-linear, branched or crosslinked. Linear polyarylene sulfides typically contain 80 mol % or more of the repeating unit —(Ar—S)—. Such linear polymers may also include a small amount of a branching unit or a cross-linking unit, but the amount of branching or cross-linking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a cross-linking structure or a branched structure introduced into the polymer a small amount of one or more monomers having three or more reactive functional groups. By way of example, monomer components used in forming a semi-linear polyarylene sulfide can include an amount of polyhaloaromatic compounds having two or more halogen substituents per molecule which can be utilized in preparing branched polymers. Such monomers can be represented by the formula R'$X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2'6,6'-tetrabromo-3,3', 5,5'-tetramethylbiphenyl, 1,2,3,4-tetrachloronaphthalene, 1,2,4-tribromo-6-methylnaphthalene, etc., and mixtures thereof.

The polyarylene sulfides, such as described above, typically have a DTUL value of from about 70° C. to about 220° C., in some embodiments from about 90° C. to about 200° C., and in some embodiments, from about 120° C. to about 180° C. as determined in accordance with ISO 75-2:2013 at a load of 1.8 MPa. The polyarylene sulfides likewise typically have a glass transition temperature of from about 50° C. to about 120° C., in some embodiments from about 60° C. to about 115° C., and in some embodiments, from about 70° C. to about 110° C., such as determined by ISO 11357-2:2020, as well as a melting temperature of from about 220° C. to about 340° C., in some embodiments from about 240° C. to about 320° C., and in some embodiments, from about 260° C. to about 300° C., such as determined in accordance with ISO 11357-3:2018.

As indicated above, substantially amorphous polymers may also be employed that lack a distinct melting point temperature. Suitable amorphous polymers may include, for instance, aromatic polycarbonates, which typically contains repeating structural carbonate units of the formula —$R^1$—O—C(O)—O—. The polycarbonate is aromatic in that at least a portion (e.g., 60% or more) of the total number of $R^1$ groups contain aromatic moieties and the balance thereof are aliphatic, alicyclic, or aromatic. In one embodiment, for instance, $R^1$ may a $C_{6-30}$ aromatic group, that is, contains at least one aromatic moiety. Typically, $R^1$ is derived from a dihydroxy aromatic compound of the general formula $HO—R^1—OH$, such as those having the specific formula referenced below:

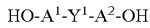

wherein, $A^1$ and $A^2$ are independently a monocyclic divalent aromatic group; and $Y^1$ is a single bond or a bridging group having one or more atoms that separate $A^1$ from $A^2$. In one particular embodiment, the dihydroxy aromatic compound may be derived from the following formula (I):

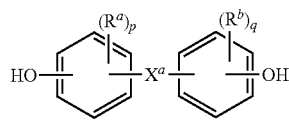

(I)

wherein, $R^a$ and $R^b$ are each independently a halogen or $C_{1-12}$ alkyl group, such as a $C_{1-3}$ alkyl group (e.g., methyl) disposed meta to the hydroxy group on each arylene group;

p and q are each independently 0 to 4 (e.g., 1); and $X^a$ represents a bridging group connecting the two hydroxy-substituted aromatic groups, where the bridging group and the hydroxy substituent of each $C_6$ arylene group are disposed ortho, meta, or para (specifically para) to each other on the $C_6$ arylene group.

In one embodiment, $X^a$ may be a substituted or unsubstituted $C_{3-18}$ cycloalkylidene, a $C_{1-25}$ alkylidene of formula $—C(R^c)(R^d)—$ wherein $R^c$ and $R^d$ are each independently hydrogen, $C_{1-12}$ alkyl, $C_{1-12}$ cycloalkyl, $C_{7-12}$ arylalcyl, $C_{7-12}$ heteroalkyl, or cyclic $C_{7-12}$ heteroarylalkyl, or a group of the formula $—C(=R^e)—$ wherein $R^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of the following formula (II):

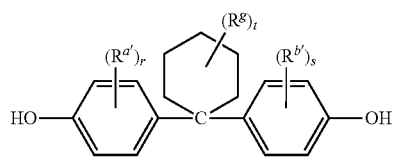

(II)

wherein, $R^{a\prime}$ and $R^{b\prime}$ are each independently $C_{1-12}$ alkyl (e.g., $C_{1-4}$ alkyl, such as methyl), and may optionally be disposed meta to the cyclohexylidene bridging group;

$R^g$ is $C_{1-12}$ alkyl (e.g., $C_{1-4}$ alkyl) or halogen;

r and s are each independently 1 to 4 (e.g., 1); and t is 0 to 10, such as 0 to 5.

The cyclohexylidene-bridged bisphenol can be the reaction product of two moles of o-cresol with one mole of cyclohexanone. In another embodiment, the cyclohexylidene-bridged bisphenol can be the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures.

In another embodiment, $X^a$ may be a $C_{1-18}$ alkylene group, a $C_{3-18}$ cycloalkylene group, a fused $C_{6-18}$ cycloalkylene group, or a group of the formula $—B^1—W—B^2—$, wherein $B^1$ and $B^2$ are independently a $C_{1-6}$ alkylene group and W is a $C_{3-12}$ cycloalkylidene group or a $C_{6-16}$ arylene group.

$X^a$ may also be a substituted $C_{3-18}$ cycloalkylidene of the following formula (III):

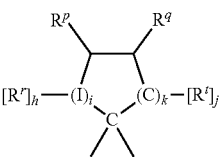

(III)

wherein, $R^r$, $R^p$, $R^q$, and $R^t$ are each independently hydrogen, halogen, oxygen, or $C_{1-12}$ organic groups;

I is a direct bond, a carbon, or a divalent oxygen, sulfur, or $—N(Z)—$, wherein Z is hydrogen, halogen, hydroxy, $C_{1-12}$ alkyl, $C_{1-12}$ alkoxy, or $C_{1-12}$ acyl;

h is 0 to 2;

j is 1 or 2;

i is 0 or 1; and k is 0 to 3, with the proviso that at least two of $R^r$, $R^p$, $R^q$, and $R^t$ taken together are a fused cycloaliphatic, aromatic, or heteroaromatic ring.

Other useful aromatic dihydroxy aromatic compounds include those having the following formula (IV):

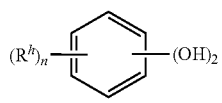

(IV)

wherein, $R^h$ is independently a halogen atom (e.g., bromine), $C_{1-10}$ hydrocarbyl (e.g., $C_{1-10}$ alkyl group), a halogen-substituted $C_{1-10}$ alkyl group, a $C_{6-10}$ aryl group, or a halogen-substituted $C_{6-10}$ aryl group;

n is 0 to 4.

Specific examples of bisphenol compounds of formula (I) include, for instance, 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl) n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). In one specific embodiment, the polycarbonate may be a linear homopolymer derived from bisphenol A, in which each of $A^1$ and $A^2$ is p-phenylene and $Y^1$ is isopropylidene in formula (I).

Other examples of suitable aromatic dihydroxy compounds may include, but not limited to, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, etc., as well as combinations thereof.

Aromatic polycarbonates, such as described above, typically have a DTUL value of from about 80° C. to about 300° C., in some embodiments from about 100° C. to about 250° C., and in some embodiments, from about 140° C. to about 220° C., as determined in accordance with ISO 75-2:2013 at a load of 1.8 MPa. The glass transition temperature may also be from about 50° C. to about 250° C., in some embodiments from about 90° C. to about 220° C., and in some embodiments, from about 100° C. to about 200° C., such as determined by ISO 11357-2:2020. Such polycarbonates may also have an intrinsic viscosity of from about 0.1 dl/g to about 6 dl/g, in some embodiments from about 0.2 to about 5 dl/g, and in some embodiments from about 0.3 to about 1 dl/g, such as determined in accordance with ISO 1628-4:1998.

In addition to the polymers referenced above, highly crystalline aromatic polymers may also be employed in the polymer composition. Particularly suitable examples of such polymers are liquid crystalline polymers, which have a high degree of crystallinity that enables them to effectively fill the small spaces of a mold. Liquid crystalline polymers are generally classified as "thermotropic" to the extent that they can possess a rod-like structure and exhibit a crystalline behavior in their molten state (e.g., thermotropic nematic state). Such polymers typically have a DTUL value of from about 120° C. to about 340° C., in some embodiments from about 140° C. to about 320° C., and in some embodiments, from about 150° C. to about 300° C., as determined in accordance with ISO 75-2:2013 at a load of 1.8 MPa. The polymers also have a relatively high melting temperature, such as from about 250° C. to about 400° C., in some embodiments from about 280° C. to about 390° C., and in some embodiments, from about 300° C. to about 380° C. Such polymers may be formed from one or more types of repeating units as is known in the art. A liquid crystalline polymer may, for example, contain one or more aromatic ester repeating units generally represented by the following Formula (I):

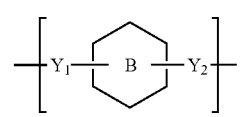

(I)

wherein, ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O).

Typically, at least one of $Y_1$ and $Y_2$ are C(O). Examples of such aromatic ester repeating units may include, for instance, aromatic dicarboxylic repeating units ($Y_1$ and $Y_2$ in Formula I are C(O)), aromatic hydroxycarboxylic repeating units ($Y_1$ is O and $Y_2$ is C(O) in Formula I), as well as various combinations thereof.

Aromatic hydroxycarboxylic repeating units, for instance, may be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 4-hydroxybenzoic acid ("HBA") and 6-hydroxy-2-naphthoic acid ("HNA"). When employed, repeating units derived from hydroxycarboxylic acids (e.g., HBA and/or HNA) typically constitute about 20 mol. % to about 80 mol. %, in some embodiments from about 25 mol. % to about 75 mol. %, and in some embodiments, from about 30 mol. % to 70 mol. % of the polymer.

Aromatic dicarboxylic repeating units may also be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether, bis(3-carboxyphenyl)ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), and 2,6-naphthalenedicarboxylic acid ("NDA"). When employed, repeating units derived from aromatic dicarboxylic acids (e.g., IA, TA, and/or NDA) typically constitute from about 1 mol. % to about 50 mol. %, in some embodiments from about 5 mol. % to about 40 mol. %, and in some embodiments, from about 10 mol. % to about 35 mol. % of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 1 mol. % to about 40 mol. %, in some embodiments from about 2 mol. % to about 35 mol. %, and in some embodiments, from about 5 mol. % to about 30 mol. % of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10 mol. % of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

Although not necessarily required, the liquid crystalline polymer may be a "low naphthenic" polymer to the extent that it contains a relatively high content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically about 10 mol. % or less, in some embodiments about 8 mol. % or less, in some embodiments about 6 mol. % or less, and in some embodiments, from about 1 mol. % to about 5 mol. % of the polymer. In one particular embodiment, for instance, the repeating units derived from naphthalene-2,6-dicarboxylic acid ("HNA") may be present in an amount of only from about 0.5 mol. % to about 15 mol. %, in some embodiments from about 1 mol. % to about 10 mol. %, and in some embodiments, from about 2 mol. % to about 8 mol. % of the polymer. In such embodiments, the liquid crystalline polymer may also contain various other monomers, such as aromatic hydroxycarboxylic acid(s) (e.g., HBA) in an amount of from about 30 mol. % to about 70 mol. %, and in some embodiments, from about 40 mol. % to about 65 mol. %; aromatic dicarboxylic acid(s) (e.g., IA and/or TA) in an amount of from about 2 mol. % to about 30 mol. %, and in some embodiments, from about 5 mol. % to about 25 mol. %; and/or aromatic diol(s) (e.g., BP and/or HQ) in an amount of from about 2 mol. % to about 40 mol. %, and in some embodiments, from about 5 mol. % to about 35 mol. %.

Of course, in other embodiments, the liquid crystalline polymer may be a "high naphthenic" polymer to the extent that it contains a relatively high content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically greater than about 10 mol. %, in some embodiments about 15 mol. % or more, and in some embodiments, from about 20 mol. % to about 60 mol. % of the polymer. In one particular embodiment, for instance, the repeating units derived from naphthalene-2,6-dicarboxylic acid ("NDA") may constitute from about 10 mol. % to about 40 mol. %, in some embodiments from about 12 mol. % to about 35 mol. %, and in some embodiments, from about 15 mol. % to about 30 mol. % of the polymer. In such embodiments, the liquid crystalline polymer may also contain various other monomers, such as aromatic hydroxycarboxylic acid(s) (e.g., HBA) in an amount of from about 20 mol. % to about 60 mol. %, and in some embodiments, from about 30 mol. % to about 50 mol. %; aromatic dicarboxylic acid(s) (e.g., IA and/or TA) in an amount of from about 2 mol. % to about 30 mol. %, and in some embodiments, from about 5 mol. % to about 25 mol. %; and/or aromatic diol(s) (e.g., BP and/or HQ) in an amount of from about 2 mol. % to about 40 mol. %, and in some embodiments, from about 5 mol. % to about 35 mol. %.

In certain embodiments, all of the liquid crystalline polymers are "low naphthenic" polymers such as described above. In other embodiments, all of the liquid crystalline polymers are "high naphthenic" polymers such as described above. In some cases, blends of such polymers may also be used. For example, low naphthenic liquid crystalline polymers may constitute from about 1 wt. % to about 50 wt. %, in some embodiments from about 2 wt. % to about 40 wt. %, and in some embodiments, from about 5 wt. % to about 30 wt. % of the total amount of liquid crystalline polymers in the composition, and high naphthenic liquid crystalline polymers may constitute from about 50 wt. % to about 99 wt. %, in some embodiments from about 60 wt. % to about 98 wt. %, and in some embodiments, from about 70 wt. % to about 95 wt. % of the total amount of liquid crystalline polymers in the composition.

B. Semiconductive Material

To help achieve the desired properties, the polymer composition also contains a semiconductive material. The semiconductive material is typically employed in an amount of from about 10 wt. % to about 70 wt. %, in some embodiments from about 20 wt. % to about 60 wt. %, and in some embodiments, from about 30 wt. % to about 50 wt. % of the composition. The volume resistivity of the semiconductive material may be selectively controlled so that it is, for example, within a range of from about 0.1 ohm-cm to about $1\times10^{12}$ ohm-cm, in some embodiments about 0.5 ohm-cm to about $1\times10^{11}$ ohm-cm, in some embodiments from about 1 to about $1\times10^{10}$ ohm-cm, and in some embodiments, from about 2 to about $1\times10^{3}$ ohm-cm, such as determined at a temperature of about 20° C. in accordance with ASTM D257-14 (technically equivalent to IEC 62631-3-1). In this manner, the volume resistivity of the resulting polymer composition may be from about $1\times10^{11}$ ohm-m to about $1\times10^{17}$ ohm-m, in some embodiments from about $1\times10^{12}$ ohm-m to about $1\times10^{16}$ ohm-m, and in some embodiments, from about $1\times10^{13}$ ohm-m to about $1\times10^{15}$ ohm-m, such as determined at a temperature of about 20° C. in accordance with ASTM D257-14 (technically equivalent to IEC 62631-3-1). The surface resistivity of the polymer composition may likewise range from about $1\times10^{13}$ ohm to about $1\times10^{19}$ ohm, in some embodiments from about $1\times10^{14}$ ohm to about $1\times10^{18}$ ohm, and in some embodiments, from about $1\times10^{15}$ ohm to about $1\times10^{17}$ ohm, such as determined at a temperature of about 20° C. in accordance with ASTM D257-14 (technically equivalent to IEC 62631-3-1).

As noted above, the semiconductive material contains inorganic particles and an electrically conductive material to help achieve the desired volume resistance. The ratio of the weight percentage of the inorganic particles in the polymer composition to the weight percentage of the electrically conductive material in the composition is typically from about 3 to about 100, in some embodiments from about 3 to about 50, in some embodiments from about 3 to about 20, in some embodiments from about 7 to about 18, and in some embodiments, from about 8 to about 15. For example, the electrically conductive material may constitute from about 1 wt. % to about 20 wt. %, in some embodiments from about 3 wt. % to about 18 wt. %, and in some embodiments, from about 5 wt. % to about 15 wt. % of the semiconductive material, while the inorganic particles may constitute from about 80 wt. % to about 99 wt. %, in some embodiments 82 wt. % to about 97 wt. %, and in some embodiments, from about 85 wt. % to about 95 wt. % of the semiconductive material. Likewise, the electrically conductive material may constitute from about 0.1 wt. % to about 15 wt. %, in some embodiments from about 0.5 wt. % to about 12 wt. %, and in some embodiments, from about 1 wt. % to about 10 wt. % of the polymer composition, while the inorganic particles may constitute from about 20 wt. % to about 60 wt. %, in some embodiments 25 wt. % to about 55 wt. %, and in some embodiments, from about 30 wt. % to about 50 wt. % of the polymer composition.

The inorganic particles generally have a low electrical conductivity, such as about 500 μS/cm or less, in some embodiments about 350 μS/cm or less, and in some embodiments, from about 50 to about 200 μS/cm, as determined at a temperature of about 25° C. The inorganic particles also have a controlled size, such as a median particle size (D50) of from about 0.1 to 100 micrometers, in some embodiments from about 0.1 to about 50 micrometers, in some embodiments from about 0.1 to about 25 micrometers, in some embodiments from about 0.1 to about 10 micrometers, in some embodiments from about 0.1 to about 5 micrometers, in some embodiments from about 0.2 to about 4 micrometers, and in some embodiments, from about 0.5 to about 3 micrometers, such as measured with ISO 13317-3:2001 (sedigraph). The particles may also have a narrow size distribution. That is, at least about 70% by volume of the particles, in some embodiments at least about 80% by volume of the particle material, and in some embodiments, at least about 90% by volume of the material may have a size within the ranges noted above. The shape of the particles may vary as desired, such as flake, spherical, platy, etc. Various inorganic particles with the characteristics noted above may be employed in the present invention, such as carbonates (e.g., calcium carbonate, copper carbonate hydroxide, etc.), fluorides (e.g., calcium fluoride), phosphates (e.g., calcium pyrophosphate), silicates (e.g., silica, potassium aluminum silicate, copper silicate, talc, mica, etc.), borates (e.g., calcium borosilicate hydroxide), alumina, sulfates (e.g., calcium sulfate, barium sulfate, etc.), as well as combinations of any of the foregoing. Barium sulfate is particularly suitable for use in the present invention.

The electrically conductive material likewise generally has a volume resistivity of less than about 0.1 ohm-cm, and in some embodiments, from about $1\times10^{-8}$ to about $1\times10^{-2}$ ohm-cm, and the insulative materials generally have a volume resistivity of greater than about $1\times10^{12}$ ohm-cm, and in some embodiments, from about $1\times10^{13}$ to about $1\times10^{18}$ ohm-cm. Suitable electrically conductive materials may include, for instance, electrically conductive carbon materials (e.g., graphite, carbon black, carbon fibers, graphene, nanotubes, etc.), metals, etc.

C. Optional Additives

A wide variety of additional additives can also be included in the polymer composition, such as lubricants, fibrous filler, thermally conductive fillers, pigments, antioxidants, stabilizers, surfactants, waxes, flame retardants, anti-drip additives, nucleating agents (e.g., boron nitride), flow modifiers, laser activatable additives, and other materials added to enhance properties and processability.

In some embodiments, the polymer composition may be "laser activatable" in the sense that it contains an additive that can be activated by a laser direct structuring ("LDS") process to form an antenna element. In such a process, the additive is exposed to a laser that causes the release of metals. The laser thus draws the pattern of conductive elements onto the part and leaves behind a roughened surface containing embedded metal particles. These particles act as nuclei for the crystal growth during a subsequent plating process (e.g., copper plating, gold plating, nickel plating, silver plating, zinc plating, tin plating, etc.). When employed, laser activatable additives typically constitute from about 0.1 wt. % to about 30 wt. %, in some embodiments from about 0.5 wt. % to about 20 wt. %, and in some embodiments, from about 1 wt. % to about 10 wt. % of the polymer composition. The laser activatable additive generally includes spinel crystals, which may include two or more metal oxide cluster configurations within a definable crystal formation. For example, the overall crystal formation may have the following general formula:

$$AB_2O_4$$

wherein,

A is a metal cation having a valance of 2, such as cadmium, chromium, manganese, nickel, zinc, copper, cobalt, iron, magnesium, tin, titanium, etc., as well as combinations thereof; and B is a metal cation having a valance of 3, such as chromium, iron, aluminum, nickel, manganese, tin, etc., as well as combinations thereof.

Typically, A in the formula above provides the primary cation component of a first metal oxide cluster and B provides the primary cation component of a second metal oxide cluster. These oxide clusters may have the same or different structures. In one embodiment, for example, the first metal oxide cluster has a tetrahedral structure and the second metal oxide cluster has an octahedral cluster. Regardless, the clusters may together provide a singular identifiable crystal type structure having heightened susceptibility to electromagnetic radiation. Examples of suitable spinel crystals include, for instance, $MgAl_2O_4$, $ZnAl_2O_4$, $FeAl_2O_4$, $CuFe_2O_4$, $CuCr_2O_4$, $MnFe_2O_4$, $NiFe_2O_4$, $TiFe_2O_4$, $FeCr_2O_4$, $MgCr_2O_4$, etc. Copper chromium oxide ($CuCr_2O_4$) is particularly suitable for use in the present invention and is available from Shepherd Color Co. under the designation "Shepherd Black 1GM."

A fibrous filler may also be employed in the polymer composition to improve the thermal and mechanical properties of the composition without having a significant impact on electrical performance. The fibrous filler typically includes fibers having a high degree of tensile strength relative to their mass. For example, the ultimate tensile strength of the fibers (determined in accordance with ASTM D2101) is typically from about 1,000 to about 15,000 Megapascals ("MPa"), in some embodiments from about 2,000 MPa to about 10,000 MPa, and in some embodiments, from about 3,000 MPa to about 6,000 MPa. To help maintain the desired dielectric properties, such high strength fibers may be formed from materials that are generally insulative in nature, such as glass, ceramics (e.g., alumina or silica), aramids (e.g., Kevler° marketed by E. I. duPont de Nemours, Wilmington, Del.), polyolefins, polyesters, etc. Glass fibers are particularly suitable, such as E-glass, A-glass, C-glass, D-glass, AR-glass, R-glass, S1-glass, S2-glass, etc.

Although the fibers employed in the fibrous filler may have a variety of different sizes, fibers having a certain aspect ratio can help improve the mechanical properties of the resulting polymer composition. That is, fibers having an aspect ratio (average length divided by nominal diameter) of from about 5 to about 50, in some embodiments from about 6 to about 40, and in some embodiments, from about 8 to about 25 are particularly beneficial. Such fibers may, for instance, have a weight average length of from about 100 to about 800 micrometers, in some embodiments from about 120 to about 500 micrometers, in some embodiments, from about 150 to about 350 micrometers, and in some embodiments, from about 200 to about 300 micrometers. The fibers may likewise have a nominal diameter of about 6 to about 35 micrometers, and in some embodiments, from about 9 to about 18 micrometers. The relative amount of the fibrous filler may also be selectively controlled to help achieve the desired mechanical and thermal properties without adversely impacting other properties of the composition, such as its flowability and dielectric properties, etc. For example, the fibrous filler may constitute from about 1 wt. % to about 40 wt. %, in some embodiments from about 3 wt. % to about 30 wt. %, and in some embodiments, from about 5 wt. % to about 20 wt. % of the polymer composition. When employed in combination with a laser activatable additive, the fibrous filler may also be employed in a sufficient amount so that the weight ratio of the fibrous filler to the combined amounts of the dielectric and laser activatable materials is from about 0.05 to about 1, in some embodiments from about 0.05 to about 0.5, in some embodiments from about 0.06 to about 0.4, and in some embodiments from about 0.1 to about 0.3.

II. Formation

The components used to form the polymer composition may be combined together using any of a variety of different techniques as is known in the art. In one particular embodiment, for example, a thermoplastic high performance polymer, inorganic particles, electrically conductive material, and other optional additives are melt processed as a mixture within an extruder to form the polymer composition. The mixture may be melt-kneaded in a single-screw or multi-screw extruder at a temperature of from about 250° C. to about 450° C. In one embodiment, the mixture may be melt processed in an extruder that includes multiple temperature zones. The temperature of individual zones is typically set within about −60° C. to about 25° C. relative to the melting temperature of the liquid crystalline polymer. By way of example, the mixture may be melt processed using a twin screw extruder such as a Leistritz 18-mm co-rotating fully intermeshing twin screw extruder. A general purpose screw design can be used to melt process the mixture. In one embodiment, the mixture including all of the components may be fed to the feed throat in the first barrel by means of a volumetric feeder. In another embodiment, different components may be added at different addition points in the extruder, as is known. For example, the liquid crystalline polymer may be applied at the feed throat, and certain additives (e.g., inorganic particles, electrically conductive material, etc.) may be supplied at the same or different temperature zone located downstream therefrom. Regardless, the resulting mixture can be melted and mixed then extruded through a die. The extruded polymer composition can then be quenched in a water bath to solidify and granulated in a pelletizer followed by drying.

The melt viscosity of the resulting composition is generally low enough that it can readily flow into the cavity of a mold to form the small-sized circuit substrate. For example, in one particular embodiment, the polymer composition may have a melt viscosity of from about 5 to about 100 Pa-s, in some embodiments from about 10 to about 95 Pa-s, and in some embodiments, from about 15 to about 90 Pa-s, determined at a shear rate of 1,000 seconds$^{-1}$. Melt viscosity may be determined in accordance with 11443:2014.

III. Substrate

Once formed, the polymer composition may be molded into the desired shape of a substrate for use in an antenna system. Due to the beneficial properties of the polymer composition, the resulting substrate may have a very small size, such as a thickness of about 5 millimeters or less, in some embodiments about 4 millimeters or less, and in some embodiments, from about 0.5 to about 3 millimeters. Typically, the shaped parts are molded using a one-component injection molding process in which dried and preheated plastic granules are injected into the mold. The conductive elements may be formed in a variety of ways, such as by plating, electroplating, laser direct structuring, etc. When containing spinel crystals as a laser activatable additive, for instance, activation with a laser may cause a physio-chemical reaction in which the spinel crystals are cracked open to release metal atoms. These metal atoms can act as a nuclei for metallization (e.g., reductive copper coating). The laser also creates a microscopically irregular surface and ablates the polymer matrix, creating numerous microscopic pits and undercuts in which the copper can be anchored during metallization.

If desired, the conductive elements may be antenna elements (e.g., antenna resonating elements) so that the resulting part forms an antenna system. The conductive elements can form antennas of a variety of different types, such as antennae with resonating elements that are formed from patch antenna elements, inverted-F antenna elements, closed and open slot antenna elements, loop antenna elements, monopoles, dipoles, planar inverted-F antenna elements, hybrids of these designs, etc. The resulting antenna system can be employed in a variety of different electronic components. As an example, the antenna system may be formed in electronic components, such as desktop computers, portable computers, handheld electronic devices, automotive equipment, etc. In one suitable configuration, the antenna system is formed in the housing of a relatively compact portable electronic component in which the available interior space is relatively small. Examples of suitable portable electronic components include cellular telephones, laptop computers, small portable computers (e.g., ultraportable computers, netbook computers, and tablet computers), wrist-watch devices, pendant devices, headphone and earpiece devices, media players with wireless communications capabilities, handheld computers (also sometimes called personal digital assistants), remote controllers, global positioning system (GPS) devices, handheld gaming devices, etc. The antenna could also be integrated with other components such as camera module, speaker or battery cover of a handheld device.

Figure 2:
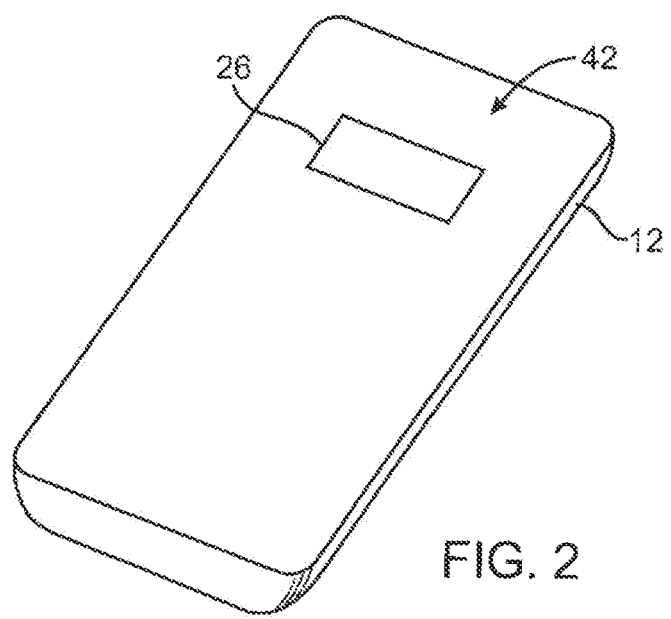
Figure 3:
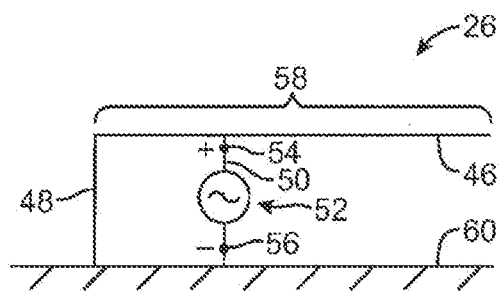
FIG. 3 is a top view of an illustrative inverted-F antenna resonating element for one embodiment of an antenna system.

One particularly suitable electronic component is shown in FIGS. 1-2 is a handheld device 10 with cellular telephone capabilities. As shown in FIG. 1, the device 10 may have a housing 12 formed from plastic, metal, other suitable dielectric materials, other suitable conductive materials, or combinations of such materials. A display 14 may be provided on a front surface of the device 10, such as a touch screen display. The device 10 may also have a speaker port 40 and other input-output ports. One or more buttons 38 and other user input devices may be used to gather user input. As shown in FIG. 2, an antenna system 26 is also provided on a rear surface 42 of device 10, although it should be understood that the antenna system can generally be positioned at any desired location of the device. The antenna system may be electrically connected to other components within the electronic device using any of a variety of known techniques. Referring again to FIGS. 1-2, for example, the housing 12 or a part of housing 12 may serve as a conductive ground plane for the antenna system 26. This is more particularly illustrated in FIG. 3, which shows the antenna system 26 as being fed by a radio-frequency source 52 at a positive antenna feed terminal 54 and a ground antenna feed terminal 56. The positive antenna feed terminal 54 may be coupled to an antenna resonating element 58, and the ground antenna feed terminal 56 may be coupled to a ground element 60. The resonating element 58 may have a main arm 46 and a shorting branch 48 that connects main arm 46 to ground 60.

Figure 4:
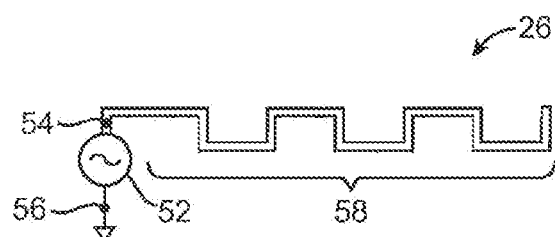
FIG. 4 is a top view of an illustrative monopole antenna resonating element for one embodiment of an antenna system.
Figure 5:
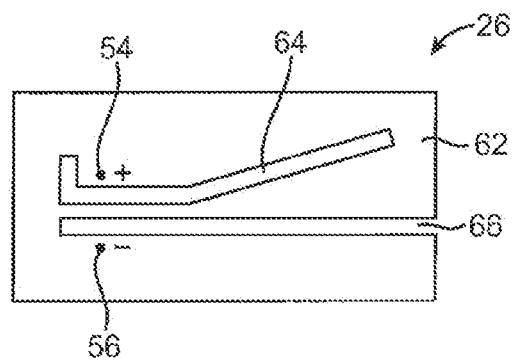
FIG. 5 is a top view of an illustrative slot antenna resonating element for one embodiment of an antenna system.
Figure 6:
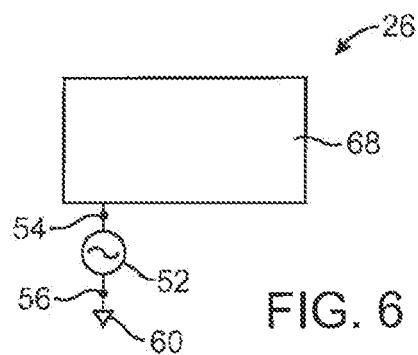
FIG. 6 is a top view of an illustrative patch antenna resonating element for one embodiment of an antenna system.
Figure 7:
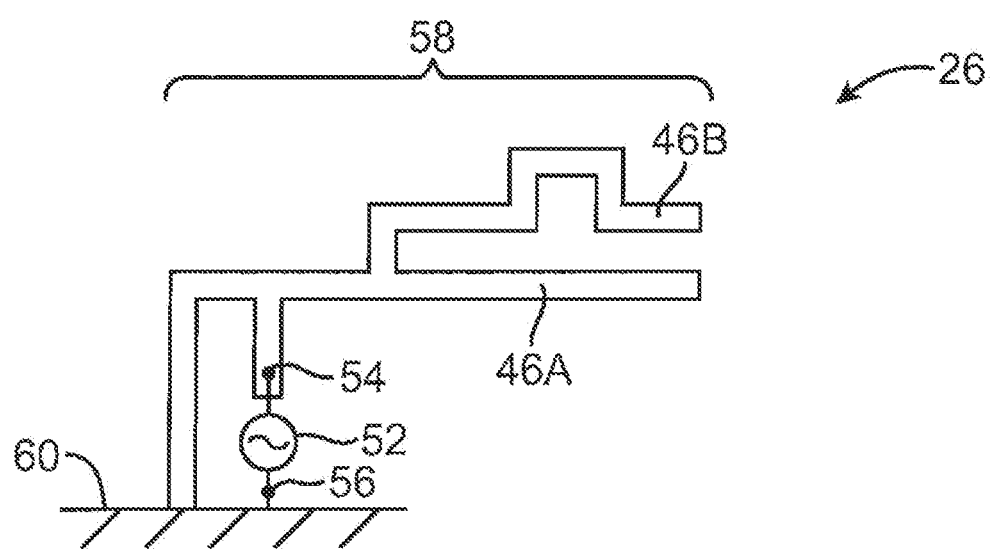
FIG. 7 is a top view of an illustrative multibranch inverted-F antenna resonating element for one embodiment of an antenna system.

Various other configurations for electrically connecting the antenna system are also contemplated. In FIG. 4, for instance, the antenna system is based on a monopole antenna configuration and the resonating element 58 has a meandering serpentine path shape. In such embodiments, the feed terminal 54 may be connected to one end of resonating element 58, and the ground feed terminal 56 may be coupled to housing 12 or another suitable ground plane element. In another embodiment as shown in FIG. 5, conductive antenna elements 62 are configured to define a closed slot 64 and an open slot 66. The antenna formed from structures 62 may be fed using positive antenna feed terminal 54 and ground antenna feed terminal 56. In this type of arrangement, slots 64 and 66 serve as antenna resonating elements for the antenna element 26. The sizes of the slots 64 and 66 may be configured so that the antenna element 26 operates in desired communications bands (e.g., 2.4 GHz and 5 GHz, etc.). Another possible configuration for the antenna system 26 is shown in FIG. 6. In this embodiment, the antenna element 26 has a patch antenna resonating element 68 and may be fed using positive antenna feed terminal 54 and ground antenna feed terminal 56. The ground 60 may be associated with housing 12 or other suitable ground plane elements in device 10. FIG. 7 shows yet another illustrative configuration that may be used for the antenna elements of the antenna system 26. As shown, antenna resonating element 58 has two main arms 46A and 46B. The arm 46A is shorter than the arm 46B and is therefore associated with higher frequencies of operation than the arm 46A. By using two or more separate resonating element structures of different sizes, the antenna resonating element 58 can be configured to cover a wider bandwidth or more than a single communications band of interest.

In certain embodiments of the present invention, the polymer composition may be particularly well suited for high frequency antennas and antenna arrays for use in base stations, repeaters (e.g., "femtocells"), relay stations, terminals, user devices, and/or other suitable components of 5G systems. As used herein, "5G" generally refers to high speed data communication over radio frequency signals. 5G networks and systems are capable of communicating data at much faster rates than previous generations of data communication standards (e.g., "4G, "LTE"). For example, as used herein, "5G frequencies" can refer to frequencies that are 1.5 GHz or more, in some embodiments about 2.0 GHz or more, in some embodiments about 2.5 GHz or higher, in some embodiments about 3.0 GHz or higher, in some embodiments from about 3 GHz to about 300 GHz, or higher, in some embodiments from about 4 GHz to about 80 GHz, in some embodiments from about 5 GHz to about 80 GHz, in some embodiments from about 20 GHz to about 80 GHz, and in some embodiments from about 28 GHz to about 60 GHz. Various standards and specifications have been released quantifying the requirements of 5G communications. As one example, the International Telecommunications Union (ITU) released the International Mobile Telecommunications-2020 ("IMT-2020") standard in 2015. The IMT-2020 standard specifies various data transmission criteria (e.g., downlink and uplink data rate, latency, etc.) for 5G. The IMT-2020 Standard defines uplink and downlink peak data rates as the minimum data rates for uploading and downloading data that a 5G system must support. The IMT-2020 standard sets the downlink peak data rate requirement as 20 Gbit/s and the uplink peak data rate as 10 Gbit/s. As another example, $3^{rd}$ Generation Partnership Project (3GPP) recently released new standards for 5G, referred to as "5G NR." 3GPP published "Release 15" in 2018 defining "Phase 1" for standardization of 5G NR. 3GPP defines 5G frequency bands generally as "Frequency Range 1" (FR1) including sub-6 GHz frequencies and "Frequency Range 2" (FR2) as frequency bands ranging from 20-60 GHz. Antenna systems described herein can satisfy or qualify as "5G" under standards released by 3GPP, such as Release 15 (2018), and/or the IMT-2020 Standard.

To achieve high speed data communication at high frequencies, antenna elements and arrays may employ small feature sizes/spacing (e.g., fine pitch technology) that can improve antenna performance. For example, the feature size (spacing between antenna elements, width of antenna elements) etc. is generally dependent on the wavelength ("λ") of the desired transmission and/or reception radio frequency propagating through the substrate dielectric on which the antenna element is formed (e.g., nλ/4 where n is an integer).

Further, beamforming and/or beam steering can be employed to facilitate receiving and transmitting across multiple frequency ranges or channels (e.g., multiple-in-multiple-out (MIMO), massive MIMO).

The high frequency 5G antenna elements can have a variety of configurations. For example, the 5G antenna elements can be or include co-planar waveguide elements, patch arrays (e.g., mesh-grid patch arrays), other suitable 5G antenna configurations. The antenna elements can be configured to provide MIMO, massive MIMO functionality, beam steering, and the like. As used herein "massive" MIMO functionality generally refers to providing a large number transmission and receiving channels with an antenna array, for example 8 transmission (Tx) and 8 receive (Rx) channels (abbreviated as 8×8). Massive MIMO functionality may be provided with 8×8, 12×12, 16×16, 32×32, 64×64, or greater.

The antenna elements can have a variety of configurations and arrangements and can be fabricated using a variety of manufacturing techniques. As one example, the antenna elements and/or associated elements (e.g., ground elements, feed lines, etc.) can employ fine pitch technology. Fine pitch technology generally refers to small or fine spacing between their components or leads. For example, feature dimensions and/or spacing between antenna elements (or between an antenna element and a ground plane) can be about 1,500 micrometers or less, in some embodiments 1,250 micrometers or less, in some embodiments 750 micrometers or less (e.g., center-to-center spacing of 1.5 mm or less), 650 micrometers or less, in some embodiments 550 micrometers or less, in some embodiments 450 micrometers or less, in some embodiments 350 micrometers or less, in some embodiments 250 micrometers or less, in some embodiments 150 micrometers or less, in some embodiments 100 micrometers or less, and in some embodiments 50 micrometers or less. However, it should be understood that feature sizes and/or spacings that are smaller and/or larger may be employed within the scope of this disclosure.

As a result of such small feature dimensions, antenna systems can be achieved with a large number of antenna elements in a small footprint. For example, an antenna array can have an average antenna element concentration of greater than 1,000 antenna elements per square centimeter, in some embodiments greater than 2,000 antenna elements per square centimeter, in some embodiments greater than 3,000 antenna elements per square centimeter, in some embodiments greater than 4,000 antenna elements per square centimeter, in some embodiments greater than 6,000 antenna elements per square centimeter, and in some embodiments greater than about 8,000 antenna elements per square centimeter. Such compact arrangement of antenna elements can provide a greater number of channels for MIMO functionality per unit area of the antenna area. For example, the number of channels can correspond with (e.g., be equal to or proportional with) the number of antenna elements.

Figure 8:
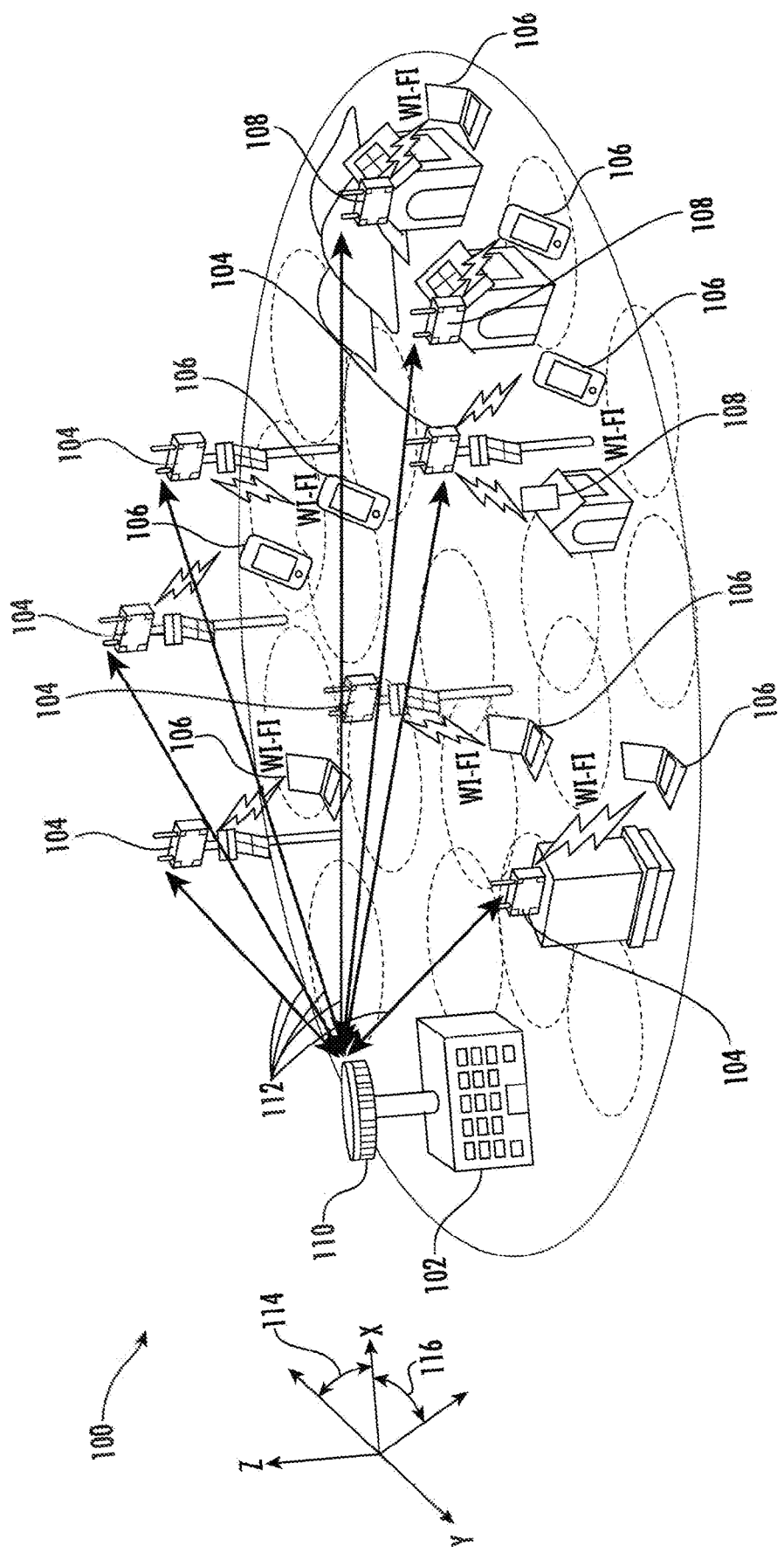
FIG. 8 depicts a 5G antenna system including a base station, one or more relay stations, one or more user computing devices, one or more or more Wi-Fi repeaters according to aspects of the present disclosure.

Referring to FIG. 8, one embodiment of a 5G antenna system 100 is shown that also includes a base station 102, one or more relay stations 104, one or more user computing devices 106, one or more Wi-Fi repeaters 108 (e.g., "femtocells"), and/or other suitable antenna components for the 5G antenna system 100. The relay stations 104 can be configured to facilitate communication with the base station 02 by the user computing devices 106 and/or other relay stations 104 by relaying or "repeating" signals between the base station 102 and the user computing devices 106 and/or relay stations 104. The base station 102 can include a MIMO antenna array 110 configured to receive and/or transmit radio frequency signals 112 with the relay station(s) 104, Wi-Fi repeaters 108, and/or directly with the user computing device(s) 106. The user computing device 106 is not necessarily limited by the present invention and include devices such as 5G smartphones.

The MIMO antenna array 110 can employ beam steering to focus or direct radio frequency signals 112 with respect to the relay stations 104. For example, the MIMO antenna array 110 can be configured to adjust an elevation angle 114 with respect to an X-Y plane and/or a heading angle 116 defined in the Z-Y plane and with respect to the Z direction. Similarly, one or more of the relay stations 104, user computing devices 106, Wi-Fi repeaters 108 can employ beam steering to improve reception and/or transmission ability with respect to MIMO antenna array 110 by directionally tuning sensitivity and/or power transmission of the device 104, 106, 108 with respect to the MIMO antenna array 110 of the base station 102 (e.g., by adjusting one or both of a relative elevation angle and/or relative azimuth angle of the respective devices).

Figure 9A:
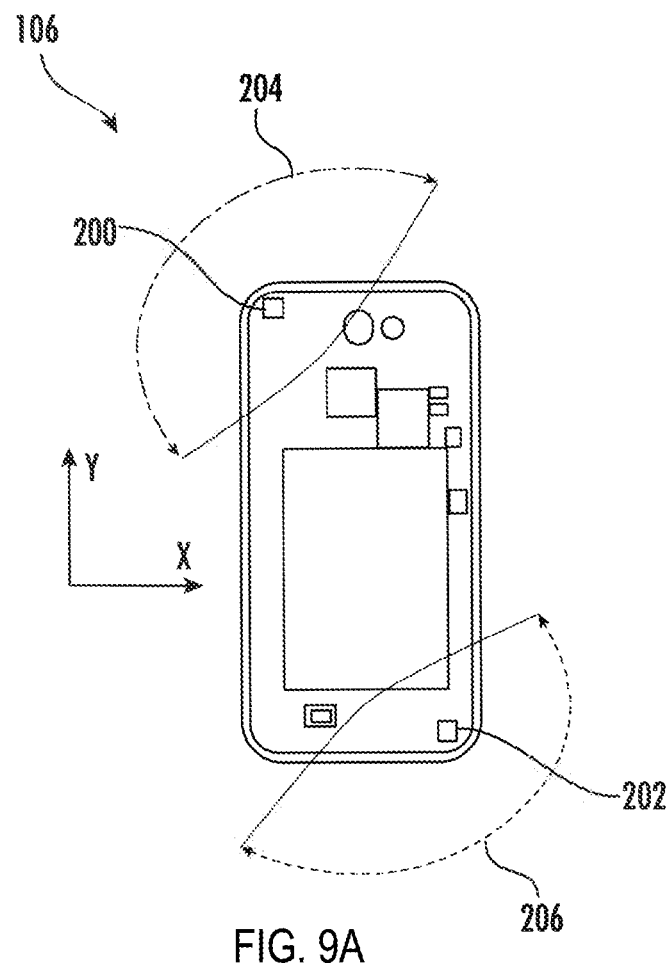
FIG. 9A illustrates a top-down view of an example user computing device including 5G antennas according to aspects of the present disclosure.
Figure 9B:
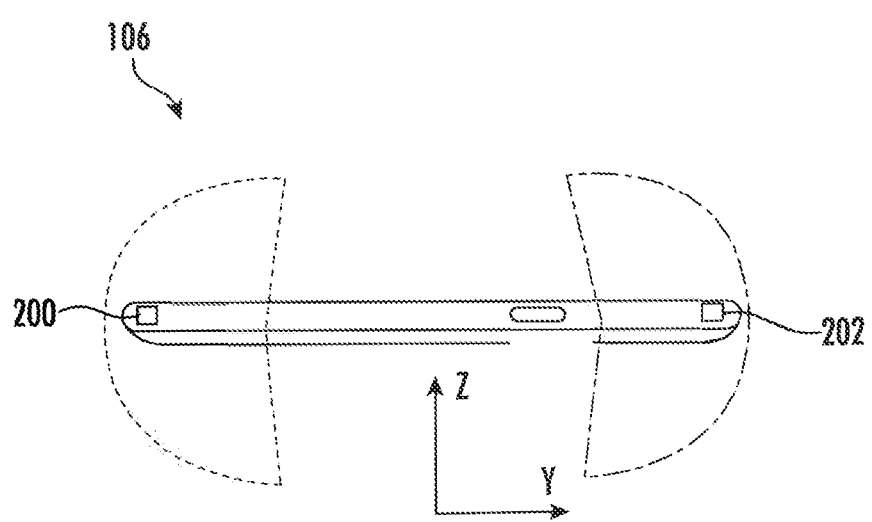
FIG. 9B illustrates a side elevation view of the example user computing device of FIG. 9A including 5G antennas according to aspects of the present disclosure.

FIGS. 9A and 9B illustrate a top-down and side elevation view, respectively, of an example user computing device 106. The user computing device 106 may include one or more antenna elements 200, 202 (e.g., arranged as respective antenna arrays). Referring to FIG. 9A, the antenna elements 200, 202 can be configured to perform beam steering in the X-Y plane (as illustrated by arrows 204, 206 and corresponding with a relative azimuth angle). Referring to FIG. 9B, the antenna elements 200, 202 can be configured to perform beam steering in the Z-Y plane (as illustrated by arrows 204, 206).

Figure 10:
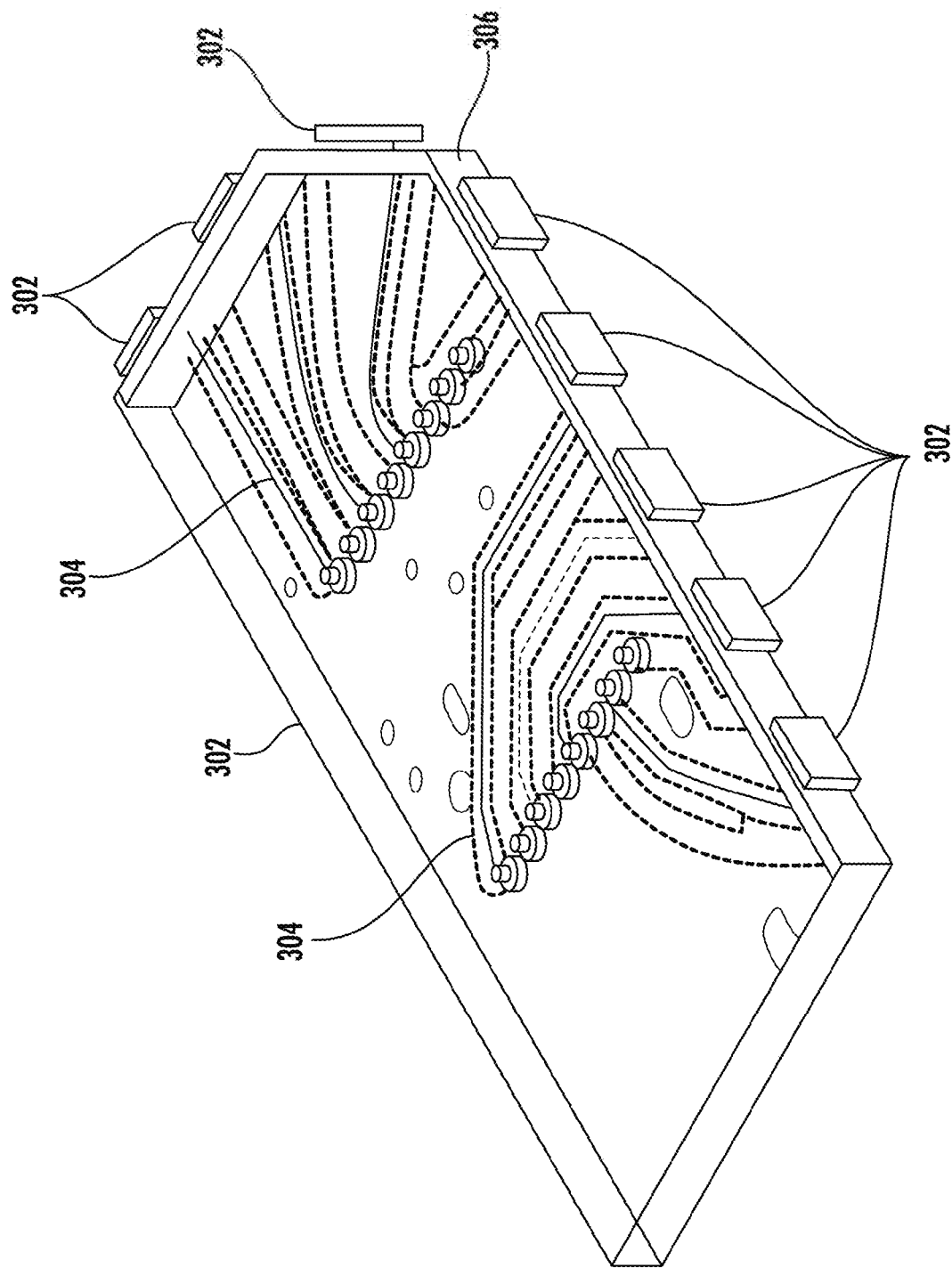
FIG. 10 illustrates an enlarged view of a portion of the user computing device of FIG. 9A.

FIG. 10 depicts a simplified schematic view of a plurality of antenna arrays 302 connected using respective feed lines 304 (e.g., with a front end module). The antenna arrays 302 can be mounted to a side surface 306 of a substrate 308, which may be formed from the polymer composition of the present invention. The antenna arrays 302 can include a plurality of vertically connected elements (e.g., as a mesh-grid array). Thus, the antenna array 302 can generally extend parallel with the side surface 306 of the substrate 308. Shielding can optionally be provided on the side surface 306 of the substrate 308 such that the antenna arrays 302 are located outside of the shielding with respect to the substrate 308. The vertical spacing distance between the vertically connected elements of the antenna array 302 can correspond with the "feature sizes" of the antenna arrays 302. As such, in some embodiments, these spacing distances may be relatively small (e.g., less than about 750 micrometers) such that the antenna array 302 is a "fine pitch" antenna array 302.

Figure 11:
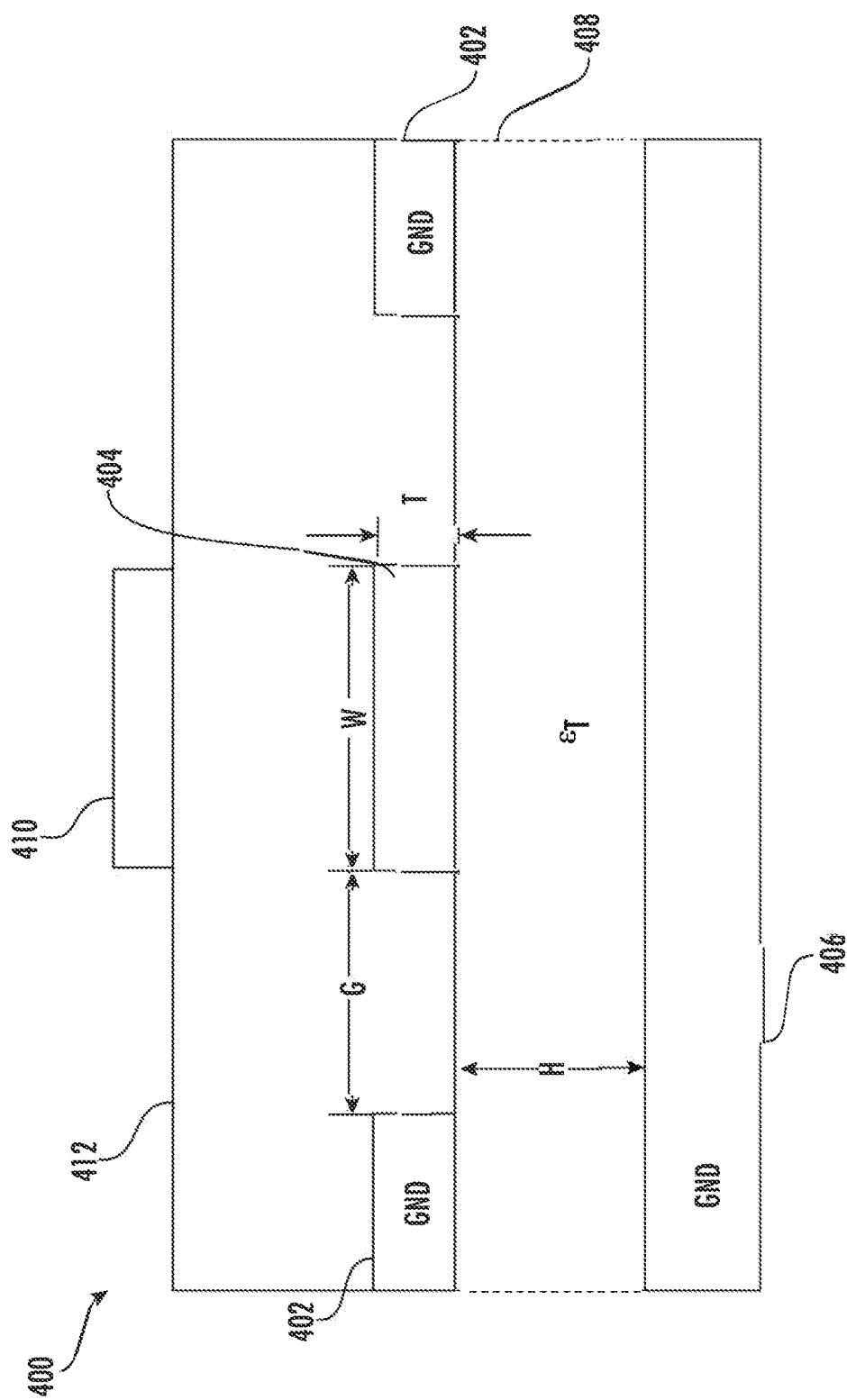
FIG. 11 illustrates a side elevation view of co-planar waveguide antenna array configuration according to aspects of the present disclosure.

FIG. 11 illustrates a side elevation view of a co-planar waveguide antenna 400 configuration. One or more co-planar ground layers 402 can be arranged parallel with an antenna element 404 (e.g., a patch antenna element). Another ground layer 406 may be spaced apart from the antenna element by a substrate 408, which may be formed from the polymer composition of the present invention. One or more additional antenna elements 410 can be spaced apart from the antenna element 404 by a second layer or substrate 412, which may also be formed from the polymer composition of the present invention. The dimensions "G" and "W" may correspond with "feature sizes" of the antenna 400. The "G" dimension may correspond with a distance between the antenna element 404 and the co-planar ground layer(s) 406. The "W" dimension can correspond with a width (e.g., linewidth) of the antenna element 404. As such, in some embodiments, dimensions "G" and "W" may be relatively small (e.g., less than about 750 micrometers) such that the antenna 400 is a "fine pitch" antenna 400.

Figure 12A:
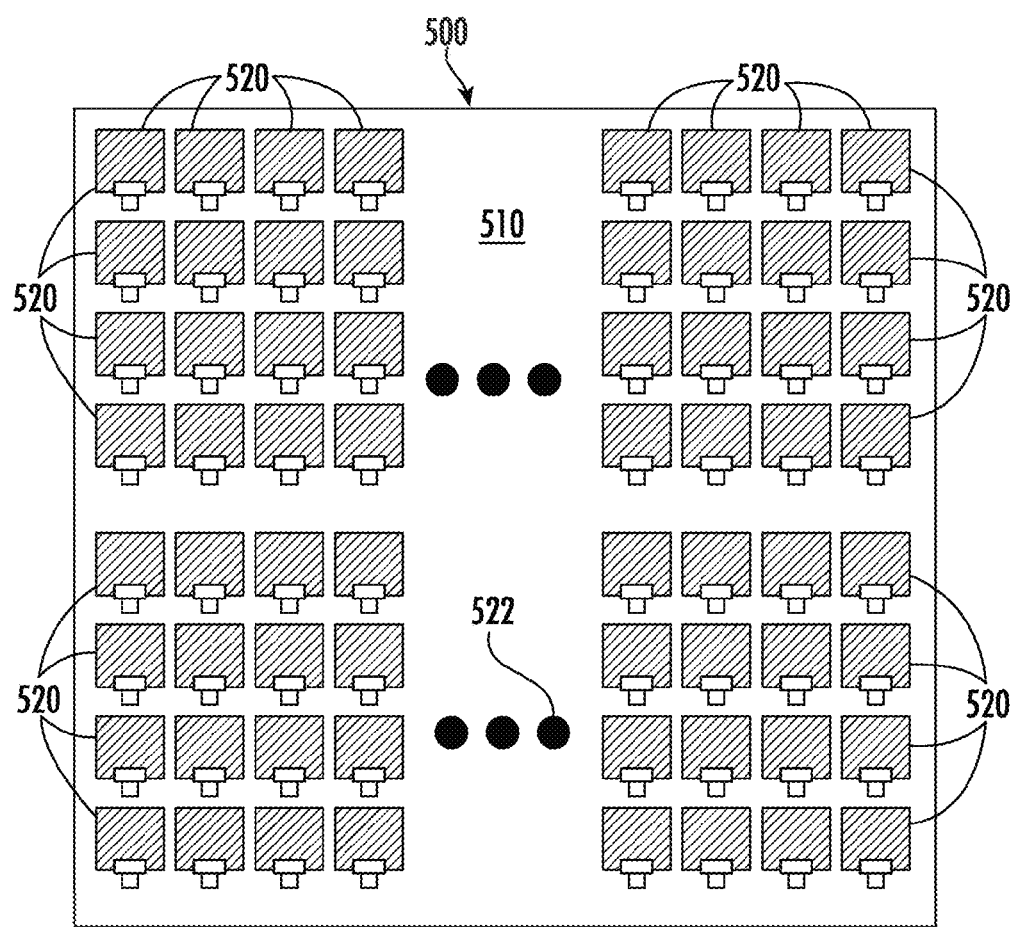
FIG. 12A illustrates an antenna array for massive multiple-in-multiple-out configurations according to aspects of the present disclosure.

FIG. 12A illustrates an antenna array 500 according to another aspect of the present disclosure. The antenna array 500 can include a substrate 510, which may be formed from the polymer composition of the present invention, and a plurality of antenna elements 520 formed thereon. The plurality of antenna elements 520 can be approximately equally sized in the X- and/or Y-directions (e.g., square or rectangular). The plurality of antenna elements 520 can be spaced apart approximately equally in the X- and/or Y-directions. The dimensions of the antenna elements 520 and/or spacing therebetween can correspond with "feature sizes" of the antenna array 500. As such, in some embodiments, the dimensions and/or spacing may be relatively small (e.g., less than about 750 micrometers) such that the antenna array 500 is a "fine pitch" antenna array 500. As illustrated by the ellipses 522, the number of columns of antenna elements 520 illustrated in FIG. 12 is provided as an example only. Similarly, the number of rows of antenna element 520 is provided as an example only.

The tuned antenna array 500 can be used to provide massive MIMO functionality, for example in a base station (e.g., as described above with respect to FIG. 8). More specifically, radio frequency interactions between the various elements can be controlled or tuned to provide multiple transmitting and/or receiving channels. Transmitting power and/or receiving sensitivity can be directionally controlled to focus or direct radio frequency signals, for example as described with respect to the radio frequency signals 112 of FIG. 8. The tuned antenna array 500 can provide a large number of antenna elements 522 in a small footprint. For example, the tuned antenna 500 can have an average antenna element concentration of 1,000 antenna elements per square cm or greater. Such compact arrangement of antenna elements can provide a greater number of channels for MIMO functionality per unit area. For example, the number of channels can correspond with (e.g., be equal to or proportional with) the number of antenna elements.

Figure 12C:
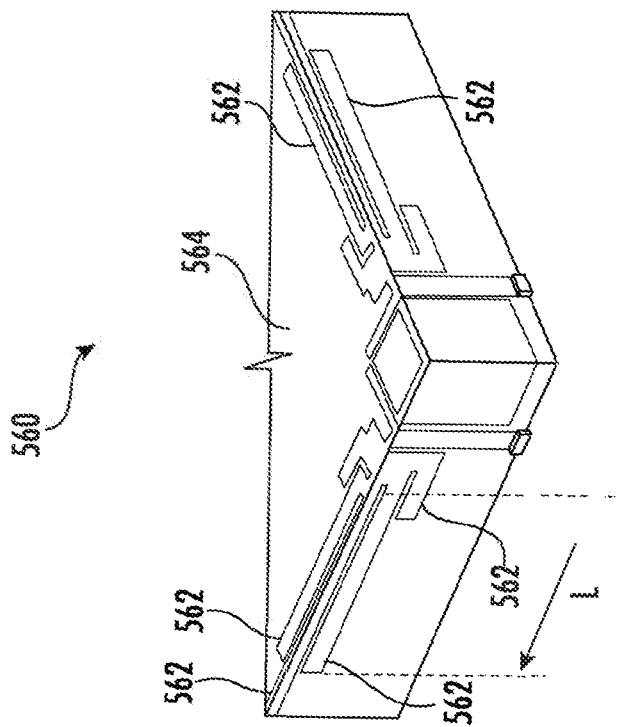
FIG. 12C illustrates an example antenna configuration according to aspects of the present disclosure.
Figure 12B:
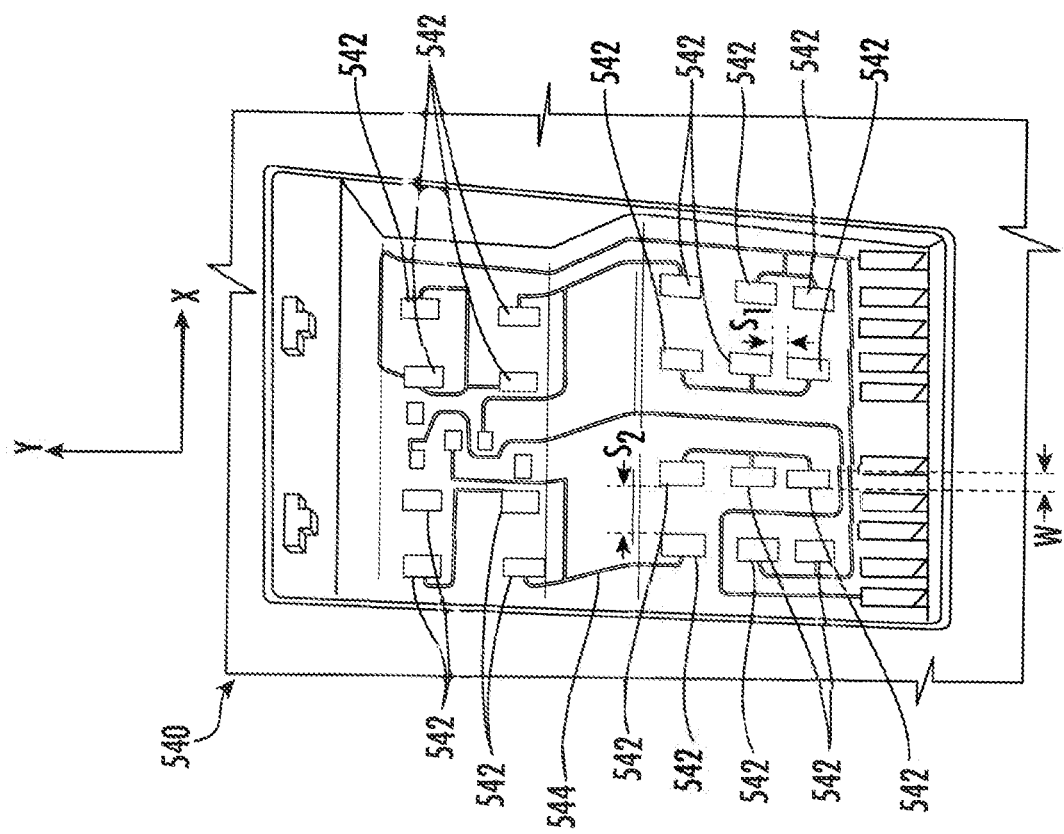
FIG. 12B illustrates an antenna array formed with laser direct structuring according to aspects of the present disclosure.

FIG. 12B illustrates an antenna array 540 formed with laser direct structuring, which may optionally be employed to form the antenna elements. The antenna array 540 can include a plurality of antenna elements 542 and plurality of feed lines 544 connecting the antenna elements 542 (e.g., with other antenna elements 542, a front end module, or other suitable component). The antenna elements 542 can have respective widths "w" and spacing distances "$S_1$" and "$S_2$" therebetween (e.g., in the X-direction and Y-direction, respectively). These dimensions can be selected to achieve 5G radio frequency communication at a desired 5G frequency. More specifically, the dimensions can be selected to tune the antenna array 540 for transmission and/or reception of data using radio frequency signals that are within the 5G frequency spectrum. The dimensions can be selected based on the material properties of the substrate. For example, one or more of "w", "$S_1$," or "$S_2$" can correspond with a multiple of a propagation wavelength ("λ") of the desired frequency through the substrate material (e.g., nλ/4 where n is an integer).

As one example, λ can be calculated as follows:

$$\lambda = \frac{c}{f\sqrt{\epsilon_R}}$$

where c is the speed of light in a vacuum, $\epsilon_R$ is the dielectric constant of the substrate (or surrounding material), f is the desired frequency.

FIG. 12C illustrates an example antenna configuration 560 according to aspects of the present disclosure. The antenna configuration 560 can include multiple antenna elements 562 arranged in parallel long edges of a substrate 564, which may be formed from the polymer composition of the present invention. The various antenna elements 562 can have respective lengths, "L" (and spacing distances therebetween) that tune the antenna configuration 560 for reception and/or transmission at a desired frequency and/or frequency range. More specifically, such dimensions can be selected based on a propagation wavelength, λ, at the desired frequency for the substrate material, for example as described above with reference to FIG. 12B.

Figure 13C:
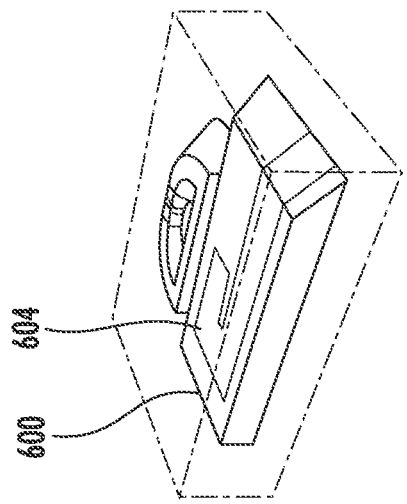
FIGS. 13A through 13C depict simplified sequential diagrams of a laser direct structuring manufacturing process that can be used to form an antenna system.
Figure 13B:
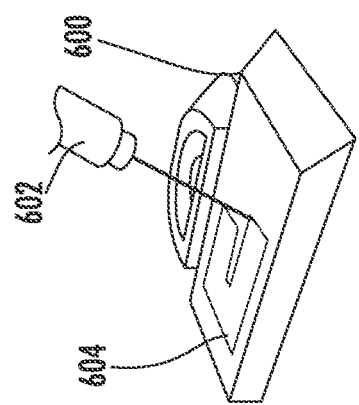
Figure 13A:
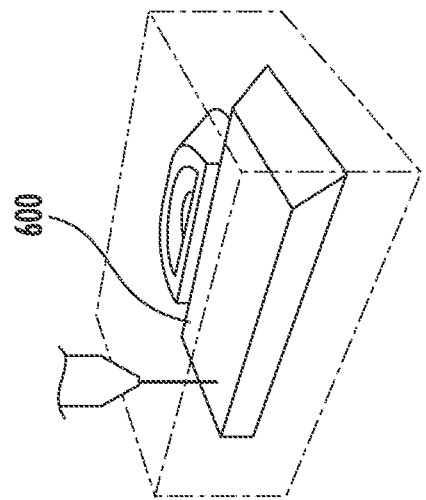

FIGS. 13A through 13C depict simplified sequential diagrams of a laser direct structuring manufacturing process that can be used to form antenna elements and/or arrays according to aspects of the present disclosure. Referring to FIG. 13A, a substrate 600 can be formed from the polymer composition of the present invention using any desired technique (e.g., injection molding). In certain embodiments, as shown in FIG. 13B, a laser 602 can be used to activate the laser activatable additive to form a circuit pattern 604 that can include one or more of the antenna elements and/or arrays. For example, the laser can melt conductive particles in the polymer composition to form the circuit pattern 604. Referring to FIG. 13C, the substrate 600 can be submerged in an electroless copper bath to plate the circuit pattern 604 and form the antenna elements, elements arrays, other components, and/or conductive lines therebetween.

The present invention may be better understood with reference to the following examples.

Test Methods

Melt Viscosity: The melt viscosity (Pa-s) may be determined in accordance with ISO Test No. 11443:2014 at a shear rate of 400 s$^{-1}$ and temperature 15° C. above the melting temperature (e.g., about 350° C.) using a Dynisco LCR7001 capillary rheometer. The rheometer orifice (die) had a diameter of 1 mm, length of 20 mm, L/D ratio of 20.1, and an entrance angle of 180°. The diameter of the barrel was 9.55 mm+0.005 mm and the length of the rod was 233.4 mm.

Melting Temperature: The melting temperature ("Tm") may be determined by differential scanning calorimetry ("DSC") as is known in the art. The melting temperature is the differential scanning calorimetry (DSC) peak melt temperature as determined by ISO Test No. 11357-3:2018. Under the DSC procedure, samples were heated and cooled at 20° C. per minute as stated in ISO Standard 10350 using DSC measurements conducted on a TA Q2000 Instrument.

Deflection Temperature Under Load ("DTUL"): The deflection under load temperature may be determined in accordance with ISO Test No. 75-2:2013 (technically equivalent to ASTM D648). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No.75-2:2013).

Tensile Modulus, Tensile Stress, and Tensile Elongation: Tensile properties may be tested according to ISO Test No.

527:2019 (technically equivalent to ASTM D638). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Modulus, Flexural Stress, and Flexural Elongation: Flexural properties may be tested according to ISO Test No. 178:2019 (technically equivalent to ASTM D790). This test may be performed on a 64 mm support span. Tests may be run on the center portions of uncut ISO 3167 multi-purpose bars. The testing temperature may be 23° C. and the testing speed may be 2 mm/min.

Charpy Impact Strength: Charpy properties may be tested according to ISO Test No. ISO 179-1:2010) (technically equivalent to ASTM D256-10, Method B). This test may be run using a Type 1 specimen size (length of 80 mm, width of 10 mm, and thickness of 4 mm). When testing the notched impact strength, the notch may be a Type A notch (0.25 mm base radius). Specimens may be cut from the center of a multi-purpose bar using a single tooth milling machine. The testing temperature may be 23° C.

Dielectric Constant ("Dk") and Dissipation Factor ("Df"): The dielectric constant (or relative static permittivity) and dissipation factor are determined using a known split-post dielectric resonator technique, such as described in Baker-Jarvis, et al., *IEEE Trans. on Dielectric and Electrical Insulation*, 5(4), p. 571 (1998) and Krupka, et al., *Proc. 7th International Conference on Dielectric Materials: Measurements and Applications, IEEE Conference Publication No.* 430 (September 1996). More particularly, a plaque sample having a size of 80 mm×90 mm×3 mm was inserted between two fixed dielectric resonators. The resonator measured the permittivity component in the plane of the specimen. Five (5) samples are tested and the average value is recorded. The split-post resonator can be used to make dielectric measurements in the low gigahertz region, such as 1 GHz from 2 GHz.

Heat Cycle Test: Specimens are placed in a temperature control chamber and heated/cooled within a temperature range of from −30° C. and 100° C. Initially, the samples are heated until reaching a temperature of 100° C., when they were immediately cooled. When the temperature reaches −30° C., the specimens are immediately heated again until reaching 100° C. Twenty three (23) heating/cooling cycles may be performed over a 3-hour time period.

Surface/Volume Resistivity: The surface and volume resistivity values may be determined in accordance with IEC 62631-3-1:2016 or ASTM D257-14. According to this procedure, a standard specimen (e.g., 1 meter cube) is placed between two electrodes. A voltage is applied for sixty (60) seconds and the resistance is measured. The surface resistivity is the quotient of the potential gradient (in V/m) and the current per unit of electrode length (in A/m), and generally represents the resistance to leakage current along the surface of an insulating material. Because the four (4) ends of the electrodes define a square, the lengths in the quotient cancel and surface resistivities are reported in ohms, although it is also common to see the more descriptive unit of ohms per square. Volume resistivity is also determined as the ratio of the potential gradient parallel to the current in a material to the current density. In SI units, volume resistivity is numerically equal to the direct-current resistance between opposite faces of a one-meter cube of the material (ohm-m or ohm-cm).

EXAMPLE 1

Samples 1-6 are formed from various combinations of liquid crystalline polymers (LCP 1, LCP 2, and LCP 3), barium sulfate particles (average particle size=1.7 µm, conductivity=100 µS/cm), carbon fibers, glass fibers, lubricant, black pigment, and alumina trihydrate. LCP 1 is formed from 43% HBA, 20% NDA, 9% TA, and 28% HQ. LCP 2 is formed from 73% HBA and 27% HNA. LCP 3 is formed from 60% HBA, 5% HNA, 17.5% TA, 2.5% BP, and 5% APAP. Compounding was performed using an 18-mm single screw extruder. Parts are injection molded the samples into plaques (60 mm×60 mm).

TABLE 1

|  | 1 | 2 | 3 | 4 | 5 | 6 |
|---|---|---|---|---|---|---|
| LCP 1 | 40.2 | 38.2 | 36.2 | — | — | — |
| LCP 2 | 2.8 | 4.2 | 5.6 | 2.8 | 4.2 | 5.6 |
| LCP 3 | — | — | — | 40.2 | 38.2 | 36.2 |
| Barium Sulfate | 40 | 40 | 40 | 35 | 35 | 35 |
| Glass Fibers | 10 | 10 | 10 | 15 | 15 | 15 |
| Carbon Fibers | 1.2 | 1.8 | 2.4 | 1.2 | 1.8 | 2.4 |
| Alumina Trihydrate | 0.5 | 0.5 | 0.5 | 0.5 | 0.5 | 0.5 |
| Lubricant | 0.3 | 0.3 | 0.3 | 0.3 | 0.3 | 0.3 |
| Black Pigment | 5 | 5 | 5 | 5 | 5 | 5 |

Samples 1-3 were tested for thermal and mechanical properties. The results are set forth below in Table 2.

TABLE 2

| Sample | 1 | 2 | 3 |
|---|---|---|---|
| Surface Resistivity (ohm) | 3.70E+16 | 4.70E+16 | 8.00E+16 |
| Volume Resistivity (ohm-m) | 1.50E+14 | 1.20E+14 | 1.10E+14 |
| Dielectric Constant (2 GHz) | 9.0 | 12.2 | 15.1 |
| Dissipation Factor (2 GHz) | 0.0152 | 0.0195 | 0.0241 |
| DTUL at 1.8 MPa (° C.) | 269 | 266 | 267 |
| Charpy Notched (kJ/m$^2$) | 7 | 7 | 7 |
| Tensile Strength (MPa) | 116 | 115 | 117 |
| Tensile Modulus (MPa) | 14191 | 14669 | 15423 |
| Tensile Elongation (%) | 1.14 | 1.09 | 1.07 |
| Flexural Strength (MPa) | 164 | 165 | 175 |
| Flexural Modulus (MPa) | 13176 | 13546 | 14459 |
| Flexural Elongation (%) | 1.5 | 1.5 | 1.6 |
| Melt Viscosity (Pa-s) at 1,000 s$^{-1}$ | 33 | 33 | 34 |
| Melting Temperature (° C., 1$^{st}$ heat of DSC) | 314.0 | 314.0 | 312.6 |

Samples 1-3 were also subjected to a heat cycle test as described above. Upon testing, it was determined that the resulting dissipation factor for the samples was 0.013, 0.017, and 0.018, respectively. Thus, the ratio of the dissipation factor after heat cycle testing to the initial dissipation factor for Samples 1, 2, and 3 was 0.86, 0.86, and 0.76, respectively. Upon testing, it was also determined that the resulting dielectric constant for the samples was 9.0, 12.2, and 15.1, respectively. Thus, the ratio of the dielectric constant after heat cycle testing to the initial dielectric constant for Samples 1, 2, and 3 was 1.01, 1.01, and 1.03, respectively.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A polymer composition comprising a semiconductive material distributed within a polymer matrix, wherein the semiconductive material includes inorganic particles and an electrically conductive material, the inorganic particles having an average particle size of from about 0.1 to about 100 µm and an electrical conductivity about 500 µS/cm or less, wherein the polymer matrix contains at least one thermoplastic high performance polymer having a deflection under load of about 40° C. or more as determined in accordance with ISO 75-2:2013 at a load of 1.8 MPa, and further wherein the polymer composition exhibits a dielectric constant of about 4 or more and a dissipation factor of about 0.3 or less, as determined at a frequency of 2 GHz.

2. The polymer composition of claim 1, wherein the composition exhibits a dielectric constant after being exposed to a temperature cycle of from about −30° C. to about 100° C., wherein the ratio of the dielectric constant after the temperature cycle to the dielectric constant prior to the heat cycle is about 0.8 or more.

3. The polymer composition of claim 1, wherein the composition exhibits a dissipation factor after being exposed to a temperature cycle of from about −30° C. to about 100° C., wherein the ratio of the dissipation factor after the temperature cycle to the dissipation factor prior to the heat cycle is about 1.3 or less.

4. The polymer composition of claim 1, wherein the thermoplastic high performance polymer has a deflection under load of from about 150° C. to about 310° C. as determined in accordance with ISO 75-2:2013 at a load of 1.8 MPa.

5. The polymer composition of claim 1, wherein the thermoplastic high performance polymer has a glass transition temperature of from about 100° C. to about 320° C. and/or a melting temperature of from about 200° C. to about 410° C.

6. The polymer composition of claim 1, wherein the thermoplastic high performance polymer includes a polyphenylene ether, polyphenylene oxide, polycarbonate, polyarylene sulfide, polyester, polyamide, liquid crystalline polymer, or a combination thereof.

7. The polymer composition of claim 6, wherein the thermoplastic high performance polymer includes a wholly aromatic liquid crystalline polymer.

8. The polymer composition of claim 7, wherein the liquid crystalline polymer has a total amount of repeating units derived from naphthenic hydroxycarboxylic and/or naphthenic dicarboxylic acids of about 10 mol. % or less.

9. The polymer composition of claim 8, wherein the liquid crystalline polymer contains HBA in an amount of from about 30 mol. % to about 70 mol. %, IA and/or TA in an amount of from about 2 mol. % to about 30 mol. %, and BP and/or HQ in an amount of from about 2 mol. % to about 40 mol. %.

10. The polymer composition of claim 7, wherein the liquid crystalline polymer has a total amount of repeating units derived from naphthenic hydroxycarboxylic and/or naphthenic dicarboxylic acids of greater than about 10 mol. %.

11. The polymer composition of claim 10, wherein the liquid crystalline polymer contains HBA in an amount of from about 20 mol. % to about 60 mol. %, IA and/or TA in an amount of from about 2 mol. % to about 30 mol. %, and BP and/or HQ in an amount of from about 5 mol. % to about 35 mol. %.

12. The polymer composition of claim 1, wherein the semiconductive material constitutes from about 10 wt. % to about 70 wt. % of the polymer composition.

13. The polymer composition of claim 1, wherein the polymer composition exhibits a volume resistivity of from about $1\times10^{11}$ ohm-m to about $1\times10^{17}$ ohm-m and/or a surface resistivity of from about $1\times10^{13}$ ohm to about $1\times10^{19}$ ohm, as determined at a temperature of about 20° C. in accordance with ASTM D257-14.

14. The polymer composition of claim 1, wherein the weight percentage of the inorganic particles to the weight percentage of the electrically conductive material is from about 3 to about 100.

15. The polymer composition of claim 1, wherein the electrically conductive material constitutes from about 0.1 wt. % to about 15 wt. % of the polymer composition and the inorganic particles constitute from about 20 wt. % to about 60 wt. % of the polymer composition.

16. The polymer composition of claim 1, wherein the inorganic particles contain barium sulfate.

17. The polymer composition of claim 1, wherein the electrically conductive material has a volume resistivity of about 0.1 ohm-cm or less.

18. The polymer composition of claim 17, wherein the electrically conductive material includes a carbon material having a volume resistivity of from about $1\times10^3$ to about $1\times10^{12}$ ohm-cm.

19. The polymer composition of claim 1, wherein the electrically conductive material includes carbon fibers.

20. The polymer composition of claim 1, wherein the polymer composition further comprises glass fibers.

21. The polymer composition of claim 1, wherein the composition has a melt viscosity of from about 5 to about 100 Pa-s, as determined at a shear rate of 1,000 seconds$^{-1}$ and a temperature of about 15° C. above the melting temperature of the polymer composition.

22. A molded part that comprises the polymer composition of claim 1.

23. The molded part of claim 22, wherein one or more conductive elements are formed on a surface of the part.

24. An antenna system that comprises a substrate that includes the polymer composition of claim 1 and at least one antenna element configured to transmit and receive radio frequency signals, wherein the antenna element is coupled to the substrate.

25. The antenna system of claim 24, wherein the radio frequency signals are 5G signals.

26. The antenna system of claim 24, wherein the at least one antenna element has a feature size that is less than about 1,500 micrometers.

27. The antenna system of claim 24, wherein the at least one antenna element comprises a plurality of antenna elements.

28. The antenna system of claim 27, wherein the plurality of antenna elements are spaced apart by a spacing distance that is less than about 1,500 micrometers.

29. The antenna system of claim 27, wherein the plurality of antenna elements comprise at least 16 antenna elements.

30. The antenna system of claim 27, wherein the plurality of antenna elements are arranged in an array.

31. The antenna system of claim 30, wherein the array is configured for at least 8 transmission channels and at least 8 reception channels.

32. The antenna system of claim 30, wherein the array has an average antenna element concentration of greater than 1,000 antenna elements per square centimeter.

33. The antenna system of claim 24, further comprising a base station, and wherein the base station comprises the at least one antenna element.

34. The antenna system of claim 33, further comprising at least one of a user computing device or a repeater, and wherein the at least one of the user computing device or the repeater base station comprises the at least one antenna element.

35. The polymer composition of claim 1, further comprising a laser activatable additive.

* * * * *